United States Patent
Ohba et al.

(10) Patent No.: US 12,081,065 B2
(45) Date of Patent: Sep. 3, 2024

(54) MOTOR

(71) Applicant: MINEBEA MITSUMI Inc., Nagano (JP)

(72) Inventors: Hirofumi Ohba, Nagano (JP); Kodai Kameoka, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 89 days.

(21) Appl. No.: 17/759,112

(22) PCT Filed: Feb. 4, 2021

(86) PCT No.: PCT/JP2021/004111
§ 371 (c)(1),
(2) Date: Jul. 20, 2022

(87) PCT Pub. No.: WO2021/157657
PCT Pub. Date: Aug. 12, 2021

(65) Prior Publication Data
US 2023/0042658 A1  Feb. 9, 2023

(30) Foreign Application Priority Data

Feb. 7, 2020 (JP) ................................ 2020-020109

(51) Int. Cl.
*H02K 1/24* (2006.01)
*H02K 1/16* (2006.01)
(Continued)

(52) U.S. Cl.
CPC ........... *H02K 1/165* (2013.01); *H02K 15/026* (2013.01); *H02K 15/085* (2013.01)

(58) Field of Classification Search
CPC .... H02K 15/026; H02K 1/165; H02K 15/085; H02K 1/24
See application file for complete search history.

(56) References Cited

U.S. PATENT DOCUMENTS 4,900,963 A * 2/1990 Amano .................... H02K 1/26
310/154.22
9,373,983 B2 6/2016 Noda et al.
(Continued)

FOREIGN PATENT DOCUMENTS

EP    2 980 961 A1    2/2016
JP    01-091640 A     4/1989
(Continued)

OTHER PUBLICATIONS

JP-2016059176-A machine translation Dec. 30, 2023.*
(Continued)

*Primary Examiner* — Leda T Pham
(74) *Attorney, Agent, or Firm* — Pearne & Gordon LLP

(57) ABSTRACT

A motor capable of increasing cogging torque is provided. A motor includes a shaft; a magnetic member including a core including an annular portion and a plurality of spokes and a coil; and a magnet, wherein one of the magnetic member and the magnet is disposed at an inner side of the other; an end portion of each of the spokes and the magnet oppose one another in radial directions nm; the core includes a pair of magnetic pole portions at the end portion of each of the spokes, the a pair of magnetic pole portions extending in both directions of circumferential directions xy; and of the pair of magnetic pole portions of at least one spoke from among the plurality of spokes, the magnetic pole portion at an x side has a larger magnetic resistance than the magnetic pole portion at a y side.

6 Claims, 17 Drawing Sheets

(51) Int. Cl.
*H02K 15/02* (2006.01)
*H02K 15/085* (2006.01)

(56) References Cited

U.S. PATENT DOCUMENTS

| | | | |
|---|---|---|---|
| 2004/0245887 A1* | 12/2004 | Fujinaka | H02K 37/12 |
| | | | 310/216.114 |
| 2010/0176676 A1 | 7/2010 | Uenishi et al. | |
| 2014/0197708 A1 | 7/2014 | Noda et al. | |
| 2016/0352159 A1* | 12/2016 | Li | H02K 1/146 |
| 2018/0062458 A1 | 3/2018 | Kobayashi et al. | |
| 2020/0052532 A1 | 2/2020 | Li et al. | |

FOREIGN PATENT DOCUMENTS

| | | | |
|---|---|---|---|
| JP | 11-103552 A | | 4/1999 |
| JP | 2003-047184 A | | 2/2003 |
| JP | 2007-068281 A | | 3/2007 |
| JP | 2008-306844 A | | 12/2008 |
| JP | 2009-213258 A | | 9/2009 |
| JP | 2011-193635 A | | 9/2011 |
| JP | 2014-150710 A | | 8/2014 |
| JP | 2014-192933 A | | 10/2014 |
| JP | 2016059176 A | * | 4/2016 |
| JP | 2018-038160 A | | 3/2018 |

OTHER PUBLICATIONS

International Search Report for corresponding International Application No. PCT/JP2021/004111 mailed Mar. 23, 2021.

Written Opinion for corresponding International Application No. PCT/JP2021/004111 dated Mar. 23, 2021 and English translation.

International Preliminary Report on Patentability for corresponding International Application No. PCT/JP2021/004111 dated Jul. 28, 2022.

Second Office Action dated Jan. 4, 2024 for corresponding Japanese Application No. 2020-020109 and English translation.

* cited by examiner

MOTOR

CROSS-REFERENCE TO RELATED APPLICATIONS

This application is a national stage entry of International Application No. PCT/JP2021/004111 filed on Feb. 4, 2021, which claims the benefit of priority to Japanese Application No. JP2020-020109, filed Feb. 7, 2020, the entire disclosures of which are hereby incorporated herein by reference.

TECHNICAL FIELD

The present invention relates to a motor.

BACKGROUND ART

Regarding a DC motor used in an information device, in a vehicle, and the like, for example, Patent Document 1 describes a structure of forming a magnet from four magnets instead of integrally forming a magnet. Patent Document 2 also describes use of an integrally formed magnet.

There is a demand to further reduce the vibrations in such DC motors, and typically the cogging torque, one cause of vibration, is reduced as much as possible.

For motors and the like used in electric doors and electric hatch gates of vehicles, there is a demand to suppress the rotation of a shaft of the motor when stopping the motor. In order to suppress the rotation of the shaft of the motor when stopping the motor, it is effective to increase the amount of cogging torque.

Patent Document 3 discloses a technique of increasing cogging torque. Patent Document 3 describes a technique for a direct current electric motor including four field magnetic poles and an armature iron core including five tooth portions radially extending from a shaft portion and opposing the field magnetic poles, and including a groove for increasing an air gap between the field magnetic poles and a distal end outer peripheral surface of each of the tooth portions of the armature iron core, the air gap being located at the center of an open angle at the distal end outer peripheral surface of each of the tooth portions of the armature iron core. Due to the presence of the air gap, when a drive voltage is not applied, an opposing positional relationship between the field magnetic poles and the armature iron core is stable, and the cogging torque increases.

However, in the technique described in Patent Document 3, the number of the field magnetic poles is limited to four and the number of the teeth portions of the armature iron core is limited to five. Also, with this technique, the cogging torque increasing effect is not sufficient, and there is a demand to generate larger cogging torque.

CITATION LIST

Patent Literature

Patent Document 1: JP H11-103552 A
Patent Document 2: JP 2008-306844 A
Patent Document 3: JP H1-91640 A

SUMMARY OF INVENTION

Technical Problem

Thus, an object of the present invention is to provide a motor capable of increasing cogging torque.

Solution to Problem

The above problems are solved by the present invention described below. That is, a motor according to the present invention includes:
a shaft;
a magnetic member including a core including an annular portion coaxially disposed with the shaft and a plurality of spokes extending from the annular portion in a radial direction, and coils wound around the spokes; and
a magnet disposed in an annular pattern coaxially with the shaft, wherein
one of the magnetic member and the magnet is disposed at an inner side of the other in the radial direction;
an end portion in the radial direction of each of the plurality of spokes and the magnet oppose one another in the radial direction;
the core includes a pair of magnetic pole portions at the end portion in the radial direction of each of the plurality of spokes, the pair of magnetic pole portions extending in both directions of circumferential directions; and
of the pair of magnetic pole portions of at least one spoke from among the plurality of spokes, a magnetic pole portion at a first side in the circumferential directions has a larger magnetic resistance than a magnetic pole portion at a second side in the circumferential directions.

In the present invention, preferably, from among the plurality of spokes, the spoke including the pair of magnetic pole portions with different magnetic resistances at the first side and at the second side in the circumferential directions is defined as a first spoke, and another spoke adjacent to the first spoke at the first side in the circumferential directions is defined as a second spoke; and
of the pair of magnetic pole portions of the second spoke, the magnetic pole portion at the second side in the circumferential directions has a larger magnetic resistance than the magnetic pole portion at the first side in the circumferential directions.

Also, in the present invention, preferably, another spoke adjacent to the second spoke at the first side in the circumferential directions is defined as a third spoke; and
of the pair of magnetic pole portions of the third spoke, the magnetic pole portion at the second side in the circumferential directions has a smaller magnetic resistance than the magnetic pole portion at the second side in the circumferential directions of the pair of magnetic pole portions of the second spoke.

In the present invention, preferably, when the number of the plurality of spokes is an even number,
from among the plurality of spokes, another spoke at a position point-symmetric to the first spoke with respect to the shaft is defined as a fourth spoke, and another spoke at a position point-symmetric to the second spoke with respect to the shaft is defined as a fifth spoke;
of the pair of magnetic pole portions of the fourth spoke, the magnetic pole portion at the first side in the circumferential directions has a larger magnetic resistance than the magnetic pole portion at the second side in the circumferential directions; and
of the pair of magnetic pole portions of the fifth spoke, the magnetic pole portion at the second side in the circumferential directions has a larger magnetic resistance than the magnetic pole portion at the first side in the circumferential directions.

In a preferable mode of the present invention, when the number of the plurality of spokes is an odd number, from among the plurality of spokes, another spoke at a position point-symmetric to a slot between the first spoke and the second spoke with respect to the shaft is defined as a fourth-a spoke;

two other spokes adjacent to the fourth-a spoke at both sides in the circumferential directions are defined as a third-a spoke and a fifth-a spoke;

both of the magnetic pole portions of the pair of magnetic pole portions of the fourth-a spoke have a substantially equal magnetic resistance; and at least one of the magnetic pole portion of the pair of magnetic pole portions of the third-a spoke at a side of the fourth-a spoke in the circumferential directions and the magnetic pole portion of the pair of magnetic pole portions of the fifth-a spoke at a side of the fourth-a spoke in the circumferential directions has a smaller magnetic resistance than one of the magnetic pole portions of the pair of magnetic pole portions of the fourth-a spoke.

Also, in another preferable mode of the present invention, when the number of the plurality of spokes is an odd number, from among the plurality of spokes, another spoke at a position point-symmetric to a slot between the first spoke and the second spoke with respect to the shaft is defined as a fourth-b spoke;

of the pair of magnetic pole portions of the fourth-b spoke, the magnetic pole portion at the first side or the second side in the circumferential directions has a larger magnetic resistance than the magnetic pole portion at the opposite side;

another spoke adjacent, in the circumferential directions, to the fourth-b spoke at a side of the magnetic pole portion with a smaller magnetic resistance of the pair of magnetic pole portions of the fourth-b spoke is defined as a third-b spoke; and of the pair of magnetic pole portions of the third-b spoke, the magnetic pole portion at a side of the fourth-b spoke in the circumferential directions has a smaller magnetic resistance than the magnetic pole portion at the first side of the pair of magnetic pole portions of the first spoke.

DESCRIPTION OF EMBODIMENTS

Embodiments being exemplary aspects of the present invention will be described below with reference to the drawings.

First Embodiment

Figure 1:
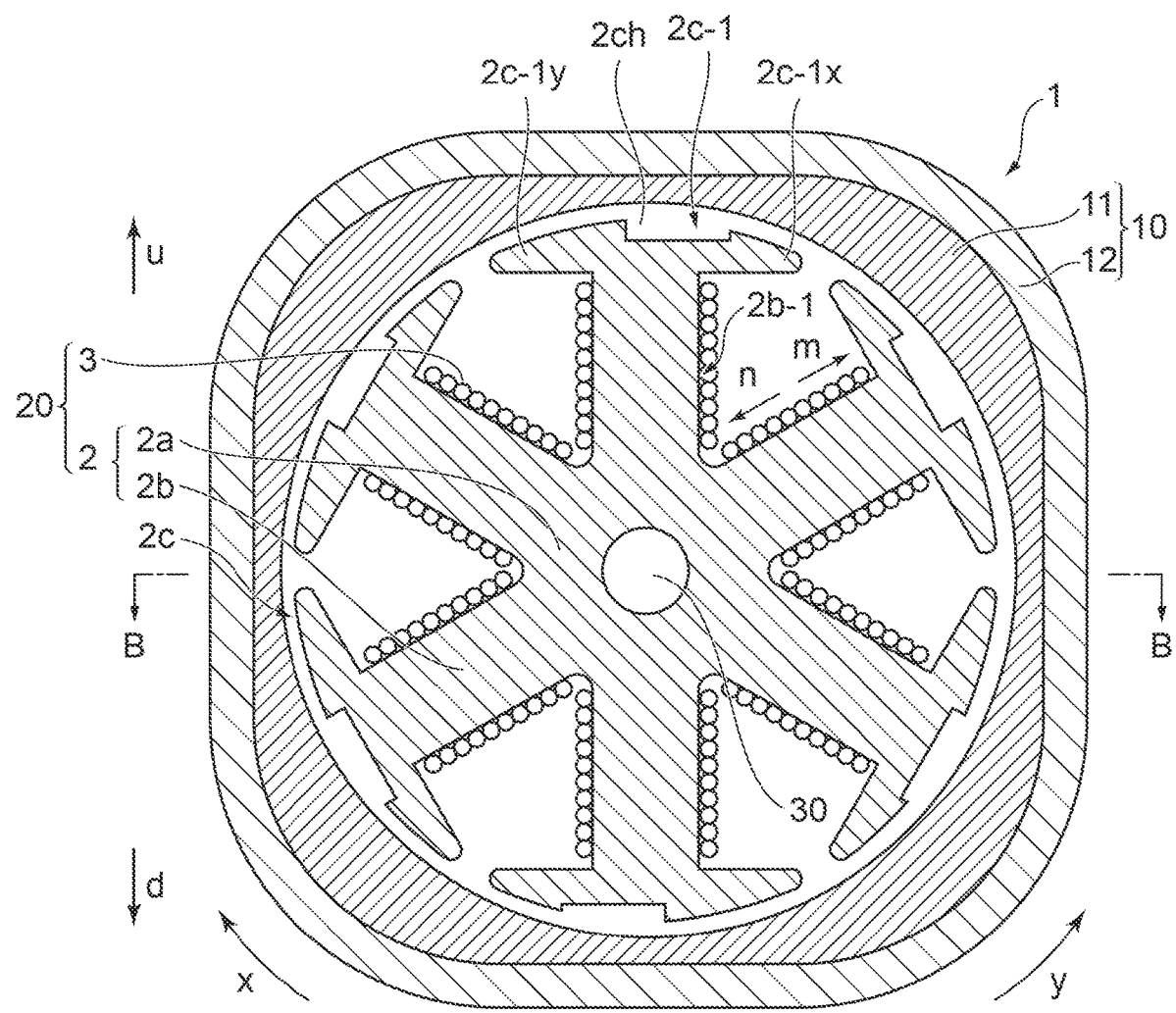
FIG. 1 is a cross-sectional view (transverse cross-sectional view) taken along a plane perpendicular to the direction of a shaft of a motor according to a first embodiment being an example of the present invention and is a cross-sectional view taken along A-A in FIG. 2.
Figure 2:
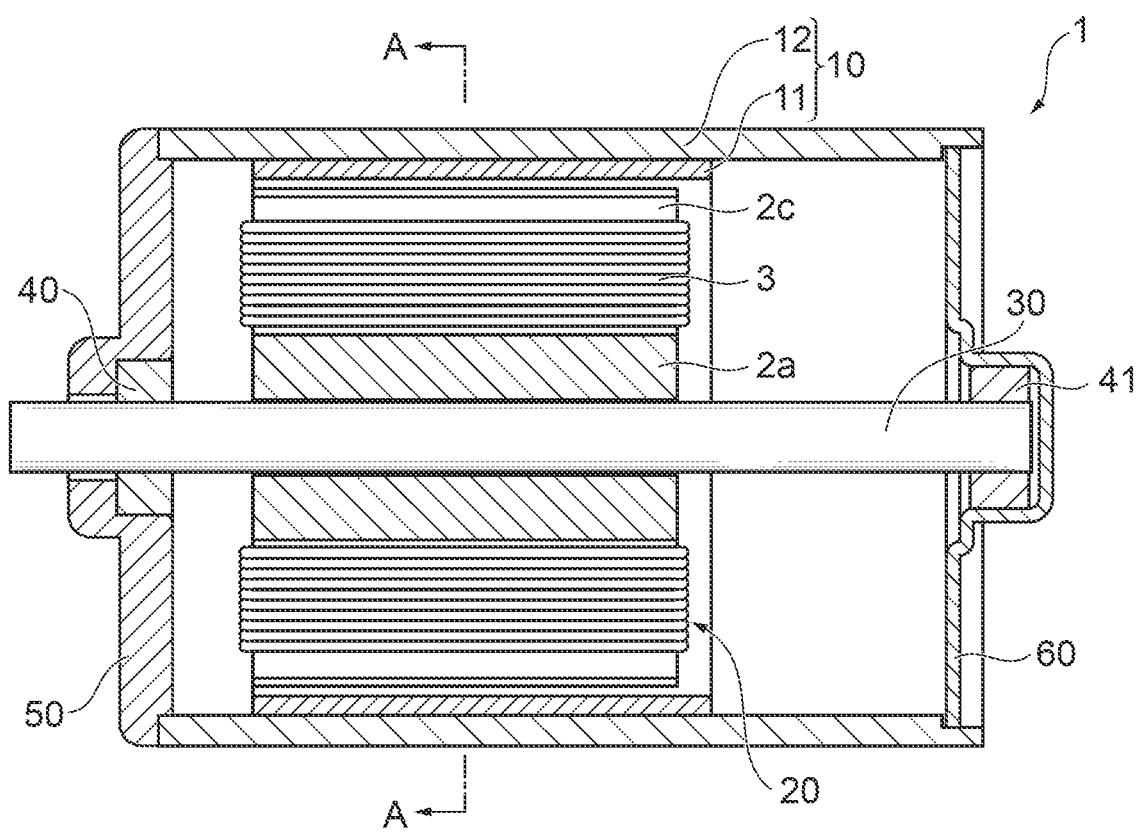
FIG. 2 is a cross-sectional view taken along a plane including the shaft of the motor according to the first embodiment and is a cross-sectional view taken along B-B in FIG. 1.

FIG. 1 is a cross-sectional view taken along a plane perpendicular to the direction of a shaft of a motor 1 according to the first embodiment being an example of the present invention. FIG. 2 is a cross-sectional view taken along a plane including the shaft. FIG. 1 is a cross-sectional view taken along line A-A in FIG. 2, and FIG. 2 is a cross-sectional view taken along line B-B in FIG. 1.

The motor 1 according to the present embodiment is a motor with a substantially quadrangular (substantially square) cross-section called a "square motor" or a "polygonal DC motor". In addition, the motor 1 according to the present embodiment includes a magnet 11 functioning as a field magnet and having an overall tubular shape. The magnet 11 has an integral structure. In the structure, the outer peripheral shape of the magnet 11 in a side cross-section in a direction perpendicular to a shaft 30 is roughly a square with rounded corners, and the inner peripheral shape of the magnet 11 in the same side cross-section is circular. The magnet 11 is disposed surrounding a rotor 20 described below, and a tubular portion 12 also functioning as a frame is disposed at the outer peripheral side of the magnet 11.

The tubular portion 12 is a magnetic body made of a ferrous material or the like and is disposed in contact with the outer periphery of the magnet 11. The tubular portion 12 has a tubular shape, and the inner peripheral shape of the tubular portion 12 in a side cross-section perpendicular to the shaft 30 is a roughly square similar to the outer peripheral shape of the magnet 11. A stator 10 is formed by the magnet 11 and the tubular portion 12. End opening portions of the tubular portion 12 are closed by a lid portion 50 and a bottom portion 60.

Note that, in the present embodiment, a "radial direction" refers to the radial direction of a circle with the shaft 30 as the axis, and a "circumferential direction" refers to the circumferential direction of a circle with the shaft 30 as the axis. In FIG. 1, an arrow m direction being an outward direction and an arrow n direction being an inward direction correspond to the radial directions (hereinafter, also referred to as "radial directions mn"), and an arrow x direction being a clockwise direction and an arrow y direction being an anticlockwise direction correspond to the circumferential directions (hereinafter, also referred to as "circumferential directions xy"). In addition, an arrow u direction in FIG. 1 corresponds to an upward direction u, and an arrow d direction corresponds to a downward direction d. The upward direction u and the downward direction d not necessarily coincide with the vertical direction in terms of the direction of gravity. The words and reference signs indicating these directions are the same in other drawings.

A rotor core (core) 2 made of iron is disposed at the inner side of the magnet 11 with a predetermined gap. The shaft 30 is fixed at the center of the rotor core 2. The rotor core 2 is a stacked body made of silicon steel plates or the like and includes an annular portion 2a surrounding the shaft 30 and six spokes 2b extending in the radial direction (radially) from the annular portion 2a with the shaft 30 as the axis.

The rotor core 2 also includes a pair of magnetic pole portions extending both of the circumferential directions xy and located at the end portion in the radial directions mn (specifically, the outward direction m) of each of the plurality (six) spokes 2b (a pair of magnetic pole portions may be collectively referred to as a "magnetic pole portion pair", and when a pair of magnetic pole portions is collectively referred to as a "magnetic pole portion pair" in the present embodiment, the reference sign "2c" or "2c-☐" (☐ is an integer) is used). A rotor coil (coil) 3 is wound around each of the six spokes 2b. The rotor core 2 and the rotor coils 3 form the rotor (magnetic member) 20.

Both ends of the shaft 30 are rotatably supported by a first bearing 40 and a second bearing 41. The first bearing 40 is fixed at the lid portion 50, and the second bearing 41 is fixed at the bottom portion 60, and the shaft 30 is fixed at the stator 10 via the bearings 40 and 41. Also, the rotor 20 is configured to be rotatable with respect to the stator 10.

A brush-type energizing mechanism omitted from the drawings is disposed at the shaft 30, and this brush-type energizing mechanism allows a drive current to be supplied to the rotor coils 3 wound around the rotor core 2 described above. The mechanical and electrical structures of the rotor 20 are the same as the mechanical and electrical structures of a rotor of a normal DC brush motor.

Figure 3:
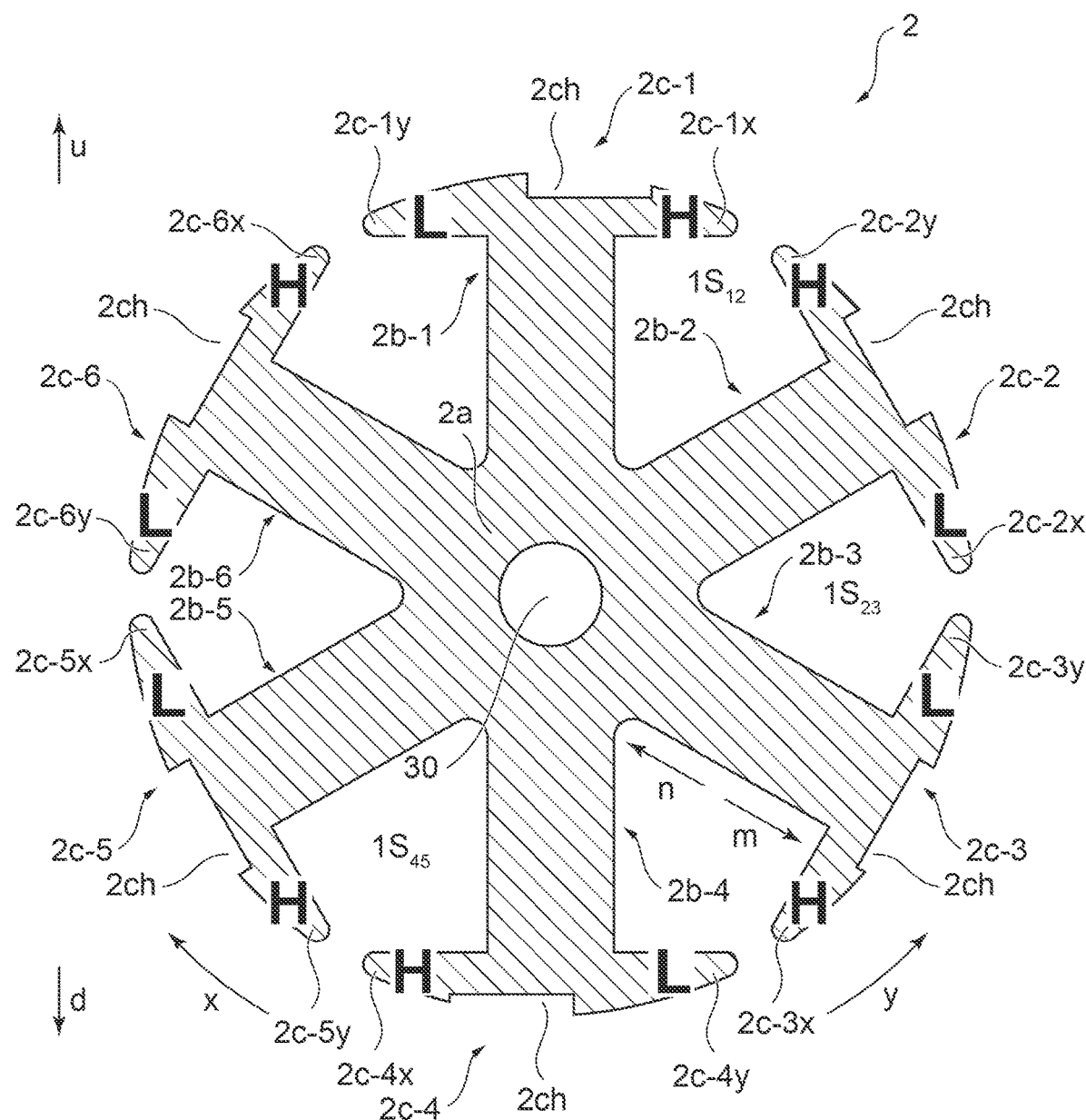
FIG. 3 is a transverse cross-sectional view of only a rotor core and the shaft extracted from the motor according to the first embodiment.

FIG. 3 is a transverse cross-sectional view of only the rotor core 2 and the shaft 30 extracted from the motor 1 according to the present embodiment. In the rotor core 2 illustrated in FIG. 3, the shapes of pairs of magnetic pole portions 2c-1x to 2c-6x and 2c-1y to 2c-6y of at least one spoke (in the present embodiment, all of the spokes 2b-1 to 2b-6) from among the plurality (even number (six in the present embodiment)) of spokes 2b-1 to 2b-6 have shapes different from one another.

A description will be given in more detail.

First, in FIG. 3, the spoke extending from the annular portion 2a in the upward direction u is defined as a first spoke 2b-1, and the spokes in order from the first spoke 2b-1 in the clockwise direction x are defined as a second spoke 2b-2, a third spoke 2b-3, a fourth spoke 2b-4, a fifth spoke 2b-5, and a sixth spoke 2b-6.

The magnetic pole portion pair 2c-1 at the end portion of the first spoke 2b-1 in the outward direction m is provided with, at the surface opposing the magnet 11, a groove portion 2ch extending parallel with the axial direction of the shaft 30. As illustrated in FIG. 3, the groove portion 2ch is located at a section offset toward the clockwise direction x side (toward the second spoke 2b-2) from the center of the magnetic pole portion pair 2c-1 in the circumferential directions xy. Thus, as illustrated in FIG. 3, the magnetic pole portion 2c-1x at the clockwise direction x side of the magnetic pole portion pair 2c-1 has a smaller transverse cross-sectional area, and the magnetic pole portion 2c-1y at the anticlockwise direction y side has a larger transverse cross-sectional area.

The transverse cross-sectional areas of the magnetic pole portions 2c-1x and 2c-1y are the cross-sectional areas of the paths where the magnetic flux passes.

Also, the magnetic resistance (reluctance) Rm is represented by Equation (1) below.

$$Rm=L/\mu A \qquad \text{Equation (1)}$$

(in Equation (1), L represents the length of the magnetic circuit, A represents the cross-sectional area, and μ represents the magnetic permeability)

That is, when the cross-sectional area μ, a denominator at the right side in Equation (1), is small, the magnetic resistance Rm is large (hereinafter, the magnetic resistance being large may also be referred to as being "high" and the reference sign "H" may be used for indication), and when the cross-sectional area μ is large, the magnetic resistance Rm is small (hereinafter, the magnetic resistance being small may also be referred to as being "low" and the reference sign "L" may be used for indication).

Compared to a case where the groove portion 2ch is located at the center of the magnetic pole portion pair 2c-1, offsetting the position of the groove portion 2ch from the center in the circumferential directions xy increases the magnetic resistance Rm of the magnetic pole portion 2c-1x close to the groove portion 2ch (reference sign H) and decreases the magnetic resistance Rm of the magnetic pole portion 2c-1y away from the groove portion 2ch (reference sign L) as illustrated in FIG. 3.

Thus, at the first spoke 2b-1, the magnetic pole portion 2c-1x at a first side in the circumferential directions xy (clockwise direction x side) has a larger magnetic resistance Rm than the magnetic pole portion 2c-1y at a second side in the circumferential directions xy (anticlockwise direction y side).

In the present embodiment, all magnetic pole portion pairs 2c-1 to 2c-6 of the six spokes 2b-1 to 2b-6 include a groove portion similar to the groove portion 2ch of the first spoke 2b-1, and the position of the groove portion 2ch is offset in either one direction (the x direction or the y direction) from the center in the circumferential directions xy.

Regarding the magnetic pole portion pair 2c-2 of the second spoke 2b-2 located adjacent to the first spoke 2b-1 at the clockwise direction x side (first side in the circumferential directions xy), as illustrated in FIG. 3, the groove portion 2ch is located at a section offset toward the anticlockwise direction y side (toward the first spoke 2b-1) from the center in the circumferential directions xy. Thus, as illustrated in FIG. 3, the magnetic pole portion 2c-2x at the clockwise direction x side of the magnetic pole portion pair 2c-2 has a larger transverse cross-sectional area, and the magnetic pole portion 2c-2y at the anticlockwise direction y side has a smaller transverse cross-sectional area.

Accordingly, compared to a case where the groove portion 2ch is located at the center of the magnetic pole portion pair 2c-2 in the circumferential directions xy, the magnetic resistance Rm of the magnetic pole portion 2c-2x away from the groove portion 2ch is decreased (reference sign L) and the magnetic resistance Rm of the magnetic pole portion 2c-2y close to the groove portion 2ch is increased (reference sign H) as illustrated in FIG. 3.

Thus, the magnetic pole portion 2c-2y at the second side of the second spoke 2b-2 in the circumferential directions xy (anticlockwise direction y side) has a larger magnetic resistance Rm than the magnetic pole portion 2c-2x at the first side in the circumferential directions xy (clockwise direction x side).

Also, regarding the magnetic pole portion pair 2c-3 of the third spoke 2b-3 located adjacent to the second spoke 2b-2 at the clockwise direction x side (first side in the circumferential directions xy), as illustrated in FIG. 3, the groove portion 2ch is located at a section offset from the center in the circumferential directions xy toward the clockwise direction x side (the opposite side to the second spoke 2b-2). Thus, as illustrated in FIG. 3, the magnetic pole portion 2c-3y at the anticlockwise direction y side of the magnetic pole portion pair 2c-3 has a larger transverse cross-sectional area. Accordingly, compared to the magnetic pole portion 2c-2y at the anticlockwise direction y side of the magnetic pole portion pair of the second spoke 2b-2, the magnetic pole portion 2c-3y has a larger transverse cross-sectional area.

Accordingly, compared to a case where the groove portion 2ch is located at the center of the magnetic pole portion pair 2c-3 in the circumferential directions xy, the magnetic resistance Rm of the magnetic pole portion 2c-3y away from the groove portion 2ch is decreased (reference sign L) as illustrated in FIG. 3. On the other hand, as described above, for the magnetic pole portion pair 2c-2, the magnetic resistance Rm of the magnetic pole portion 2c-2y close to the groove portion 2ch is increased (reference sign H).

Thus, the magnetic pole portion 2c-3y at the second side in the circumferential directions xy (anticlockwise direction y side) of the magnetic pole portion pair 2c-3 of the third spoke 2b-3 has a smaller magnetic resistance Rm than the magnetic pole portion 2c-2y at the second side in the circumferential directions xy (anticlockwise direction y side) of the magnetic pole portion pair 2c-2 of the second spoke 2b-2.

Also, regarding the magnetic pole portion pair 2c-4 of the fourth spoke 2b-4 at a position point-symmetric to the first spoke 2b-1 with respect to the shaft 30, as illustrated in FIG. 3, the groove portion 2ch is located at a section offset from the center in the circumferential directions xy toward the clockwise direction x side (the opposite side to the third spoke 2b-3). Thus, as illustrated in FIG. 3, the magnetic pole portion 2c-4y at the anticlockwise direction y side of the magnetic pole portion pair 2c-4 has a larger transverse cross-sectional area, and the magnetic pole portion 2c-4x at the clockwise direction x side has a smaller transverse cross-sectional area.

Accordingly, compared to a case where the groove portion 2ch is located at the center of the magnetic pole portion pair 2c-4 in the circumferential directions xy, the magnetic resistance Rm of the magnetic pole portion 2c-4y away from the groove portion 2ch is decreased (reference sign L) and the magnetic resistance Rm of the magnetic pole portion 2c-4x close to the groove portion 2ch is increased (reference sign H) as illustrated in FIG. 3.

Also, regarding the magnetic pole portion pair 2c-5 of the fifth spoke 2b-5 located at a position point-symmetric to the second spoke 2b-2 with respect to the shaft 30, as illustrated in FIG. 3, the groove portion 2ch is located at a section offset from the center in the circumferential directions xy toward the anticlockwise direction y side (toward the fourth spoke 2b-4). Thus, as illustrated in FIG. 3, the magnetic pole portion 2c-5x at the clockwise direction x side of the magnetic pole portion pair 2c-5 has a larger transverse cross-sectional area, and the magnetic pole portion 2c-5y at the anticlockwise direction y side has a smaller transverse cross-sectional area.

Accordingly, compared to a case where the groove portion 2ch is located at the center of the magnetic pole portion pair 2c-5 in the circumferential directions xy, the magnetic resistance Rm of the magnetic pole portion 2c-5x away from the groove portion 2ch is decreased (reference sign L) and the magnetic resistance Rm of the magnetic pole portion 2c-5y close to the groove portion 2ch is increased (reference sign H) as illustrated in FIG. 3.

Also, regarding the sixth spoke 2b-6 located between the first spoke 2b-1 and the fifth spoke 2b-5, as illustrated in FIG. 3, the groove portion 2ch is located at a section offset from the center in the circumferential directions xy toward the clockwise direction x side (toward the first spoke 2b-1). Thus, in a similar manner, the transverse cross-sectional area of the magnetic pole portion 2c-6x is smaller and the transverse cross-sectional area of the magnetic pole portion 2c-6y is larger. Accordingly, compared to a case where the groove portion 2ch is located at the center of the magnetic pole portion pair 2c-6 in the circumferential directions xy, the magnetic resistance Rm of the magnetic pole portion 2c-6y away from the groove portion 2ch is decreased (reference sign L) and the magnetic resistance Rm of the magnetic pole portion 2c-6x close to the groove portion 2ch is increased (reference sign H) as illustrated in FIG. 3.

In the present embodiment, for all of the magnetic pole portion pairs 2c-1 to 2c-6 of the six spokes 2b-1 to 2b-6, the magnetic resistances Rm of the magnetic pole portions 2c-1x to 2c-6x are different from the magnetic resistances Rm of the magnetic pole portions 2c-1y to 2c-6y. Thus, the magnetic balance in the circumferential directions xy is upset, and an increase in cogging torque can be achieved.

The mechanism for increasing the cogging torque according to the configuration of the present embodiment will be described below. However, the mechanism in the following description is a model created for the sake of description and includes some inferences. Thus, the mechanism is not guaranteed to actually work.

Figure 4:
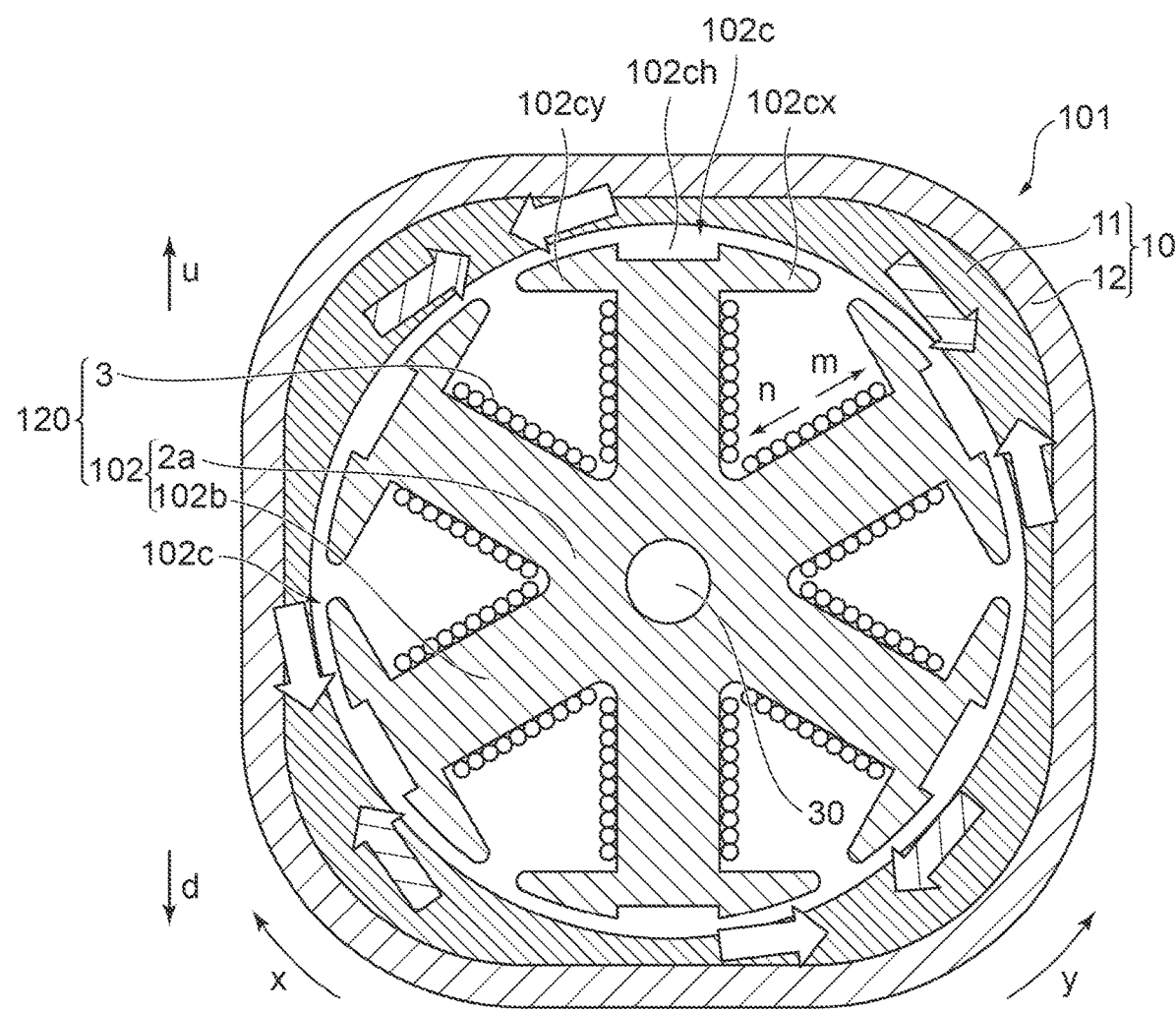
FIG. 4 is a cross-sectional view (transverse cross-sectional view) taken along a plane perpendicular to the direction of a shaft of a motor according to a conventional example for describing the mechanism for generating cogging torque.

FIG. 4 is a cross-sectional view (transverse cross-sectional view) taken along a plane perpendicular to the direction of the shaft of a motor according to a conventional example. FIG. 4 is a diagram for describing a mechanism for generating cogging torque in the motor according to the conventional example.

A motor 101 of the conventional example has a similar configuration to the motor 1 according to the first embodiment except that the shape of a rotor core 102 of a rotor 120 is different. Thus, in the conventional example of FIG. 4, members having the same configuration as the members of the first embodiment are given the same reference signs.

Regarding the rotor core 102 of the conventional example, the magnetic pole portion pair 102c of the spoke 102b at the end portion in the outward direction m is provided with, at the surface opposing the magnet 11, a groove portion 102ch extending parallel with the axial direction of the shaft 30. However, as illustrated in FIG. 4, in the rotor core 102 of the conventional example, the groove portions 102ch are centrally located in the circumferential directions xy at the pairs of magnetic pole portions 102cx and 102cy of all of the spokes 102b.

Thus, as illustrated in FIG. 4, the magnetic pole portion 102cx at the clockwise direction x side of the pair of magnetic pole portions 102cx and 102cy has an equal transverse cross-sectional area to the magnetic pole portion 102cy at the anticlockwise direction y side. Thus, at the spoke 102b, the magnetic pole portion 102cx at the first side in the circumferential directions xy (clockwise direction x side) has a substantially equal magnetic resistance Rm to the magnetic pole portion 102cy at the second side in the circumferential directions xy (anticlockwise direction y side).

In FIG. 4, the force in a direction corresponding to the cogging torque is schematically indicated with a white arrow, and the force in a direction canceling the cogging torque is indicated with a hatched arrow (this is also the case for FIG. 5 described below). The magnetic resistances Rm of the magnetic pole portion 102cx and the magnetic pole portion 102cy are substantially equal, and thus there is a magnetic balance in the circumferential direction. That is, because the force corresponding to the cogging torque and the force canceling the cogging torque are generated in opposite directions, the force corresponding to the cogging torque is canceled, and the cogging torque is reduced in the motor 101 of the conventional example.

Figure 5:
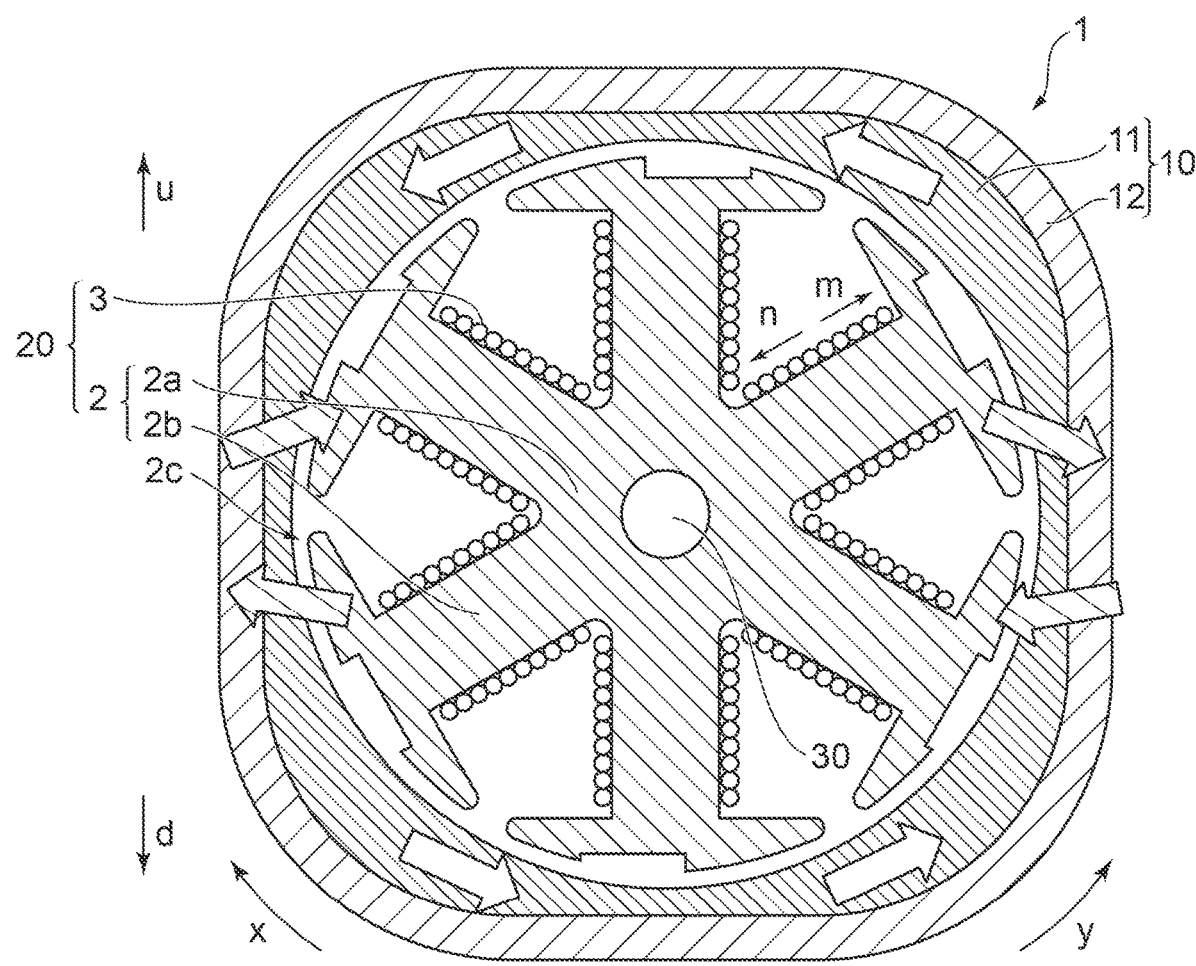
FIG. 5 is a cross-sectional view (transverse cross-sectional view) taken along a plane perpendicular to the direction of the shaft of the motor according to the first embodiment, similar to FIG. 1, and is a view for describing the mechanism for generating cogging torque.

FIG. 5 is a cross-sectional view (transverse cross-sectional view) taken along a plane perpendicular to the direction of the shaft of the motor according to the first embodiment, similar to FIG. 1, and is a view for describing the mechanism for generating cogging torque. As described above, in the present embodiment, for all of the magnetic pole portion pairs 2c-1 to 2c-6 of the six spokes 2b-1 to 2b-6, the magnetic resistances Rm of the magnetic pole portions 2c-1x to 2c-6x at the first side (clockwise direction x side) in the circumferential directions xy are different from the magnetic resistances Rm of the magnetic pole portions 2c-1y to 2c-6y at the second side (anticlockwise direction y side) in the circumferential directions xy.

Thus, the magnetic balance in the circumferential directions is upset. That is, it is assumed that the force (hatched arrow) canceling the cogging torque is directed in the radial direction because the magnetic resistance Rm is decreased and the magnetic flux is made easier to pass through, and thus the force canceling the cogging torque is weakened and the force corresponding to the cogging torque is not canceled, so that in the motor 1 of the present embodiment, the cogging torque may be increased.

In the present embodiment, a description has been given to an example in which, for all of the magnetic pole portion pairs 2c-1 to 2c-6 of the six spokes 2b-1 to 2b-6, the magnetic resistances Rm of the magnetic pole portions 2c-1x to 2c-6x are different from the magnetic resistances Rm of the magnetic pole portions 2c-1y to 2c-6y. However, when the magnetic resistances Rm of a pair of magnetic pole portions of the magnetic pole portion pair of at least one of the six spokes 2b-1 to 2b-6 are different, the magnetic balance in the circumferential directions is upset and the cogging torque can be increased. However, the present embodiment is particularly preferable because, as described below, conditions (conditions A, B, and C) for further increasing the cogging torque are satisfied.

In the present embodiment, regarding the magnetic pole portion pair 2c-2 of the second spoke 2b-2, the magnetic pole portion 2c-2y at the second side in the circumferential directions xy (anticlockwise direction y side) has a larger magnetic resistance Rm than the magnetic pole portion 2c-2x at the first side in the circumferential directions xy (clockwise direction x side). Thus, as illustrated in FIG. 3, at a slot $1S_{12}$ between the first spoke 2b-1 and the second spoke 2b-2, the magnetic pole portion 2c-1x and the magnetic pole portion 2c-2y both with a large magnetic resistance Rm (reference sign H) are located close to one another. In this manner, when sections with a large magnetic resistance Rm are concentrated at a position in the circumferential directions xy, the magnetic balance is upset to a greater degree.

In this manner, the cogging torque can be further increased by disposing magnetic pole portions having a large magnetic resistance Rm close to one another at at least one slot (condition A).

The effect of increasing the cogging torque according to condition A is not limited to the case of the present embodiment in which the number of the spokes of the rotor core is six, and a similar effect is obtained when condition A is satisfied irrespective of the number of the spokes.

Thus, in the present embodiment, the magnetic pole portion 2c-3y at the second side in the circumferential directions xy (anticlockwise direction y side) of the magnetic pole portion pair 2c-3 of the third spoke 2b-3 adjacent to the second spoke 2b-2 at the first side (clockwise direction x side) in the circumferential directions xy has a smaller magnetic resistance Rm than the magnetic pole portion 2c-2y at the second side in the circumferential directions xy (anticlockwise direction y side) of the magnetic pole portion pair of the second spoke 2b-2.

Thus, as illustrated in FIG. 3, at a slot $1S_{23}$ between the second spoke 2b-2 and the third spoke 2b-3, the magnetic pole portion 2c-2x and the magnetic pole portion 2c-3y both with a small magnetic resistance Rm are located close to one another. That is, at the slot $1S_{23}$ directly adjacent to the slot $1S_{12}$ between the first spoke 2b-1 and the second spoke 2b-2 where the magnetic pole portion 2c-1x and the magnetic pole portion 2c-2y both with a large magnetic resistance Rm are located close to one another, the magnetic pole portion 2c-2x and the magnetic pole portion 2c-3y both with a small magnetic resistance Rm are located close to one another. In this manner, when sections with a large magnetic resistance Rm and a small magnetic resistance Rm are located close to one another in the circumferential directions xy, the magnetic balance is upset to a further greater degree.

In this manner, regarding the circumferentially contiguous two slots $1S_{12}$ and $1S_{23}$, the magnetic pole portions both with a large magnetic resistance Rm (reference sign H) are located close to one another at the slot $1S_{12}$ and the magnetic pole portions both with a small magnetic resistance Rm (reference sign L) are located close to one another at the slot $1S_{23}$, so that a section with a large magnetic resistance Rm and a section with a small magnetic resistance Rm are disposed close to one another (condition B). Thus, it is possible to even further increase the cogging torque.

The effect of increasing the cogging torque according to condition B is not limited to the case of the present embodiment in which the number of the spokes of the rotor core is six, and a similar effect is obtained when condition B is satisfied irrespective of the number of the spokes.

Furthermore, in the present embodiment, the number of the spokes of the rotor core 2 is an even number, and, at the magnetic pole portion pair 2c-4 of the fourth spoke 2b-4 at a position point-symmetric to the first spoke 2b-1 with respect to the shaft 30, the magnetic resistance Rm of the magnetic pole portion 2c-4y is small (reference sign L) and the magnetic resistance Rm of the magnetic pole portion 2c-4x is large (reference sign H).

Also, at the magnetic pole portion pair 2c-5 of the fifth spoke 2b-5 at a position point-symmetric to the second spoke 2b-2 with respect to the shaft 30, the magnetic resistance Rm of the magnetic pole portion 2c-5x is small (reference sign L) and the magnetic resistance Rm of the magnetic pole portion 2c-5y is large (reference sign H).

Thus, as illustrated in FIG. 3, at a slot $1S_{45}$ between the fourth spoke 2b-4 and the fifth spoke 2b-5 at a position point-symmetric to the slot $1S_{12}$ between the first spoke 2b-1 and the second spoke 2b-2 with respect to the shaft 30, the magnetic pole portion 2c-4x and the magnetic pole portion 2c-5y both with a large magnetic resistance Rm (reference sign H) are located close to one another.

Thus, as described above, also at the slot $1S_{12}$ between the first spoke 2b-1 and the second spoke 2b-2, the magnetic pole portion 2c-1x and the magnetic pole portion 2c-2y both with a large magnetic resistance Rm (reference sign H) are located close to one another. Thus, the slots where magnetic pole portions with a large magnetic resistance Rm are located close to one another in the circumferential directions xy are located point-symmetrically.

In this manner, in the present embodiment, because the slots where magnetic pole portions with a large magnetic resistance Rm are located close to one another are located point-symmetrically (condition C), the cogging torque can be multiplicatively increased.

The effect of increasing the cogging torque according to condition C is not limited to the case of the present embodiment in which the number of the spokes of the rotor core is six, and a similar effect is obtained when condition C is satisfied as long as the number of the spokes is an even number.

Second Embodiment

Next, a motor according to a second embodiment being an example of the present invention will be described with reference to the drawings. The motor according to the second embodiment has the same configuration as the configuration of the motor 1 according to the first embodiment, except that the shape of the rotor core is different.

Figure 6:
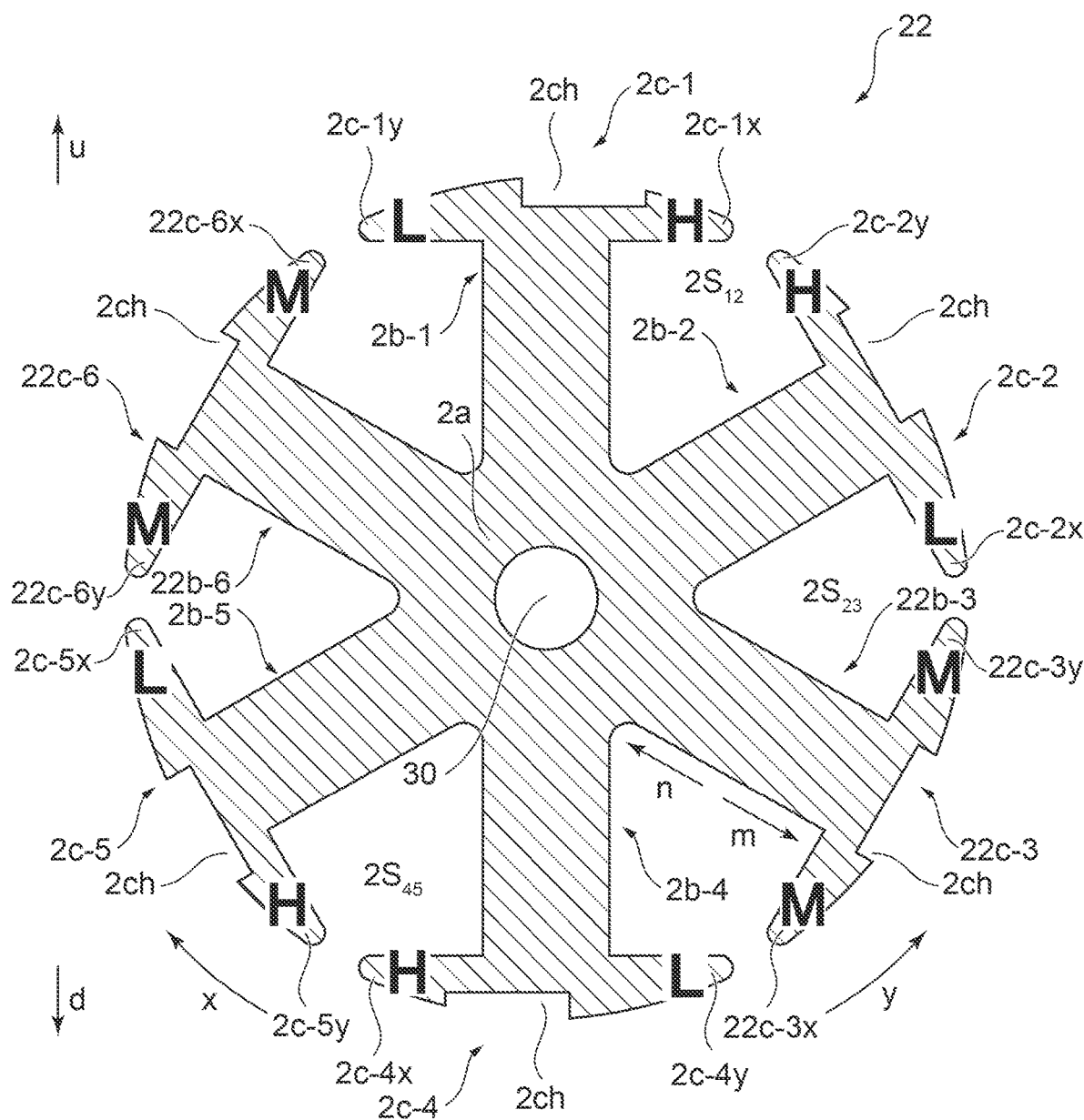
FIG. 6 is a transverse cross-sectional view of only a rotor core and a shaft extracted from a motor according to a second embodiment.

Thus, the present embodiment is described using FIG. 6 being a transverse cross-sectional view of only an extracted rotor core (core) 22 and the extracted shaft 30. FIGS. 1 and 2 can be referred to for other configurations and the overall configuration of the motor according to the present embodiment.

In addition, among the six spokes 2b-1 to 2b-6 in the first embodiment, only the magnetic pole portions (reference signs 22c-3 and 22c-6 in FIG. 6) corresponding to the magnetic pole portion pairs 2c-3 and 2c-6 of the third spoke 2b-3 and the sixth spoke 2b-6 have different shapes in the present embodiment, and otherwise the shape and structure are the same as the shape and structure of the rotor core 2 according to the first embodiment. Thus, in the present embodiment illustrated in FIG. 6, members having the same configuration as the members of the first embodiment are given the same reference signs, and detailed descriptions of the members will be omitted.

In the present embodiment, regarding the magnetic pole portion pair 22c-3 of the third spoke 22b-3 adjacent to the second spoke 2b-2 at the clockwise direction x side (first side in the circumferential directions xy), as illustrated in FIG. 6, the groove portion 2ch is centrally located in the circumferential directions xy. Also, regarding the magnetic pole portion pair 22c-6 of the sixth spoke 22b-6 at a position point-symmetric to the third spoke 22b-3 with respect to the shaft 30, the groove portion 2ch is centrally located in the circumferential directions xy as with the magnetic pole portion pair 22c-3.

That is, in the present embodiment, regarding the magnetic pole portion pairs 22c-3 and 22c-6 of the third spoke 22b-3 and the sixth spoke 22b-6 at a position point-symmetric to the third spoke 22b-3 with respect to the shaft 30, the positions of the groove portions 2ch are not offset in the circumferential directions xy. Thus, as illustrated in FIG. 6, the pair of magnetic pole portions 22c-3x and 22c-3y and the pair of magnetic pole portions 22c-6x and 22c-6y of the magnetic pole portion pair 22c-3 and the magnetic pole portion pair 22c-6 are substantially equal in terms of the transverse cross-sectional area.

Thus, at the magnetic pole portion pair 22c-3, the magnetic resistances Rm of the magnetic pole portion 22c-3x and the magnetic pole portion 22c-3y are substantially equal to one another. The magnetic resistance Rm in this case is smaller (lower) than the magnetic resistance Rm in a case of the reference sign H and larger (higher) than the magnetic resistance Rm in a case of the reference sign L. The magnetic resistance Rm of the magnetic pole portion when the position of the groove portion 2ch is not offset in the circumferential directions xy is referred to as "medium", and this is indicated in FIG. 6 using the reference sign "M" (this is also the case for other embodiments and diagrams).

In the present embodiment, for the magnetic pole portion pairs 2c-○ of the four spokes 2b-○ (○ corresponds to 1, 2, 4, or 5 and the same also applies to the present embodiment described below) from among the six spokes 2b-1 to 22b-6, the magnetic resistances Rm of the magnetic pole portions 2c-○x at the first side (clockwise direction x side) in the circumferential directions xy are different from the magnetic resistances Rm of the magnetic pole portions 2c-○y at the second side (anticlockwise direction y side) in the circumferential directions xy. Thus, in the present embodiment, the magnetic balance in the circumferential directions is upset, and an increase in cogging torque can be achieved.

Also, in the present embodiment, the magnetic pole portion 2c-2y at the second side in the circumferential directions xy (anticlockwise direction y side) of the magnetic pole portion pair 2c-2 of the second spoke 2b-2 has a larger magnetic resistance Rm than the magnetic pole portion 2c-2x at the first side in the circumferential directions xy (clockwise direction x side).

Thus, as illustrated in FIG. 6, at a slot $2S_{12}$ between the first spoke 2b-1 and the second spoke 2b-2, the magnetic pole portion 2c-1x and the magnetic pole portion 2c-2y both with a large magnetic resistance Rm (reference sign H) are located close to one another. In this manner, the cogging torque can be further increased by disposing magnetic pole portions having a large magnetic resistance Rm close to one another at at least one slot (condition A).

Thus, in the present embodiment, the magnetic resistance Rm (reference sign M) of the magnetic pole portion 22c-3y at the second side in the circumferential directions xy (anticlockwise direction y side) of the magnetic pole portion pair 22c-3 of the third spoke 22b-3 adjacent to the second spoke 2b-2 at the first side in the circumferential directions xy (clockwise direction x side) is less than the magnetic resistance Rm (reference sign H) of the magnetic pole portion 2c-2y at the second side in the circumferential directions xy (anticlockwise direction y side) of the magnetic pole portion pair of the second spoke 2b-2.

Thus, as illustrated in FIG. 6, at a slot $2S_{23}$ between the second spoke 2b-2 and the third spoke 22b-3, the magnetic pole portion 2c-2x with a small magnetic resistance Rm and the magnetic pole portion 2c-3y with a medium magnetic resistance Rm are located close to one another. That is, at the slot $2S_{23}$ directly adjacent to the slot $2S_{12}$ between the first spoke 2b-1 and the second spoke 2b-2 where the magnetic pole portion 2c-1x and the magnetic pole portion 2c-2y both with a large magnetic resistance Rm are located close to one another, the magnetic pole portion 2c-2x and the magnetic pole portion 22c-3y with a relatively small magnetic resistance Rm are located close to one another. In this manner, when sections with a large magnetic resistance Rm and a small magnetic resistance Rm are located close to one another in the circumferential directions xy, the magnetic balance is upset to a further greater degree.

In this manner, regarding the circumferentially contiguous two slots $2S_{12}$ and $2S_{23}$, the magnetic pole portions both with a large magnetic resistance Rm (reference sign H) are located close to one another at the slot $2S_{12}$ and the magnetic pole portion with a small magnetic resistance Rm (reference sign L) and the magnetic pole portion with a medium magnetic resistance Rm (reference sign M) are located close to one another at the slot $2S_{23}$ (condition B). Thus, it is possible to even further increase the cogging torque.

Furthermore, in the present embodiment, the number of the spokes of the rotor core 22 is an even number, and, at the magnetic pole portion pair 2c-4 of the fourth spoke 2b-4 at a position point-symmetric to the first spoke 2b-1 with respect to the shaft 30, the magnetic resistance Rm of the magnetic pole portion 2c-4y is small (reference sign L) and the magnetic resistance Rm of the magnetic pole portion 2c-4x is large (reference sign H).

Also, at the magnetic pole portion pair 2c-5 of the fifth spoke 2b-5 at a position point-symmetric to the second spoke 2b-2 with respect to the shaft 30, the magnetic resistance Rm of the magnetic pole portion 2c-5x is small (reference sign L) and the magnetic resistance Rm of the magnetic pole portion 2c-5y is large (reference sign H).

Thus, as illustrated in FIG. 6, at a slot $2S_{45}$ between the fourth spoke 2b-4 and the fifth spoke 2b-5 at a position point-symmetric to the slot $2S_{12}$ between the first spoke 2b-1 and the second spoke 2b-2 with respect to the shaft 30, the magnetic pole portion 2c-4x and the magnetic pole portion 2c-5y both with a large magnetic resistance Rm are located close to one another.

Thus, as described above, also at the slot $2S_{12}$ between the first spoke 2b-1 and the second spoke 2b-2, the magnetic pole portion 2c-1x and the magnetic pole portion 2c-2y both with a large magnetic resistance Rm are located close to one another. Thus, the slots where magnetic pole portions with a large magnetic resistance Rm are located close to one another in the circumferential directions xy are located point-symmetrically.

In this manner, in the present embodiment, because the slots where magnetic pole portions with a large magnetic resistance Rm are located close to one another are located point-symmetrically (condition C), the cogging torque can be multiplicatively increased.

Third Embodiment

Next, a motor according to a third embodiment being an example of the present invention will be described with reference to the drawings. The motor according to the third embodiment has the same configuration as the configuration of the motor 1 according to the first embodiment, except that the shape of the rotor core is different.

Thus, the present embodiment will be described using FIG. 7 being a transverse cross-sectional view of only an extracted rotor core (core) 32 and the extracted shaft 30. FIGS. 1 and 2 can be referred to for other configurations and the overall configuration of the motor according to the present embodiment.

Figure 7:
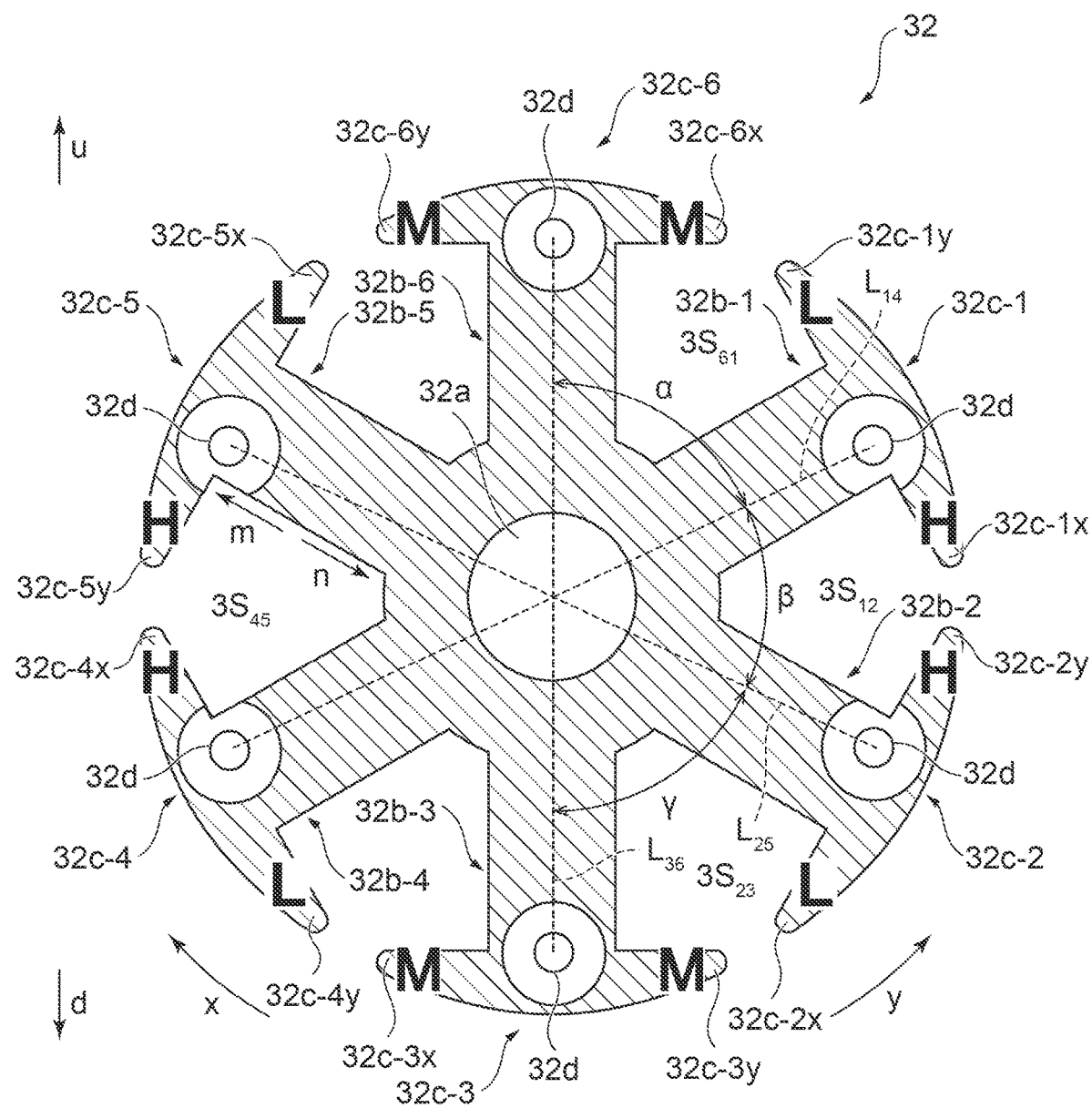
FIG. 7 is a transverse cross-sectional view of only a rotor core and a shaft extracted from a motor according to a third embodiment.

As illustrated in FIG. 7, a shape like the groove portion 2ch in the first embodiment is not provided at the magnetic pole portion pairs 32c-1 to 32c-6. In the present embodiment, instead of groove portions, the positions where crimped portions 32d are provided are offset in the circumferential directions xy. Here, the "crimped portion" refers to a recess portion provided by applying a pressure to the rotor core in the thickness direction (axial direction of the shaft) to fix together and integrate the rotor core formed from a stacked body of silicon steel plates, or the like.

The crimped portions 32d are provided at or near the magnetic pole portion pairs 32c-1 to 32c-6 of the spokes 32b-1 to 32b-6.

When the crimped portions 32d are provided at the rotor core 32, the magnetic flux is formed avoiding the portions of the crimped portions 32d. Thus, the regions at or near the crimped portions 32d tend to have increased magnetic resistance Rm.

In the present embodiment, as illustrated in FIG. 7, the positions of the crimped portions 32d provided at the first spoke 32b-1 and the fourth spoke 32b-4 at a position point-symmetric to the first spoke 32b-1 with respect to the shaft 30 are offset toward the clockwise direction x side in the circumferential directions xy. The positions of the crimped portions 32d provided at the first spoke 32b-1 and the fourth spoke 32b-4 are located point-symmetrically with respect to the shaft 30.

Also, as illustrated in FIG. 7, the positions of the crimped portions 32d provided at the second spoke 32b-2 and the fifth spoke 32b-5 at a position point-symmetric to the second spoke 32b-2 with respect to the shaft 30 are offset toward the anticlockwise direction y side in the circumferential directions xy. The positions of the crimped portions 32d provided at the second spoke 32b-2 and the fifth spoke 32b-5 are located point-symmetrically with respect to the shaft 30.

Note that, as illustrated in FIG. 7, the positions of the crimped portions 32d provided at the third spoke 32b-3 and the sixth spoke 32b-6 at a position point-symmetric to the third spoke 32b-3 with respect to the shaft 30 are centrally located in the circumferential directions xy at the third spoke 32b-3 and the sixth spoke 32b-6 and are not offset.

A line segment connecting positions of the crimped portions 32d provided at the first spoke 32b-1 and the fourth spoke 32b-4 is defined as a line segment $L_{14}$, a line segment connecting positions of the crimped portions 32d provided at the second spoke 32b-2 and the fifth spoke 32b-5 is defined as a line segment $L_{25}$, and a line segment connecting positions of the crimped portions 32d provided at the third spoke 32b-3 and the sixth spoke 32b-6 is defined as a line segment $L_{36}$.

The relationship between an angle α(°) formed by the line segment $L_{36}$ and the line segment $L_{14}$, an angle β(°) formed by the line segment $L_{14}$ and the line segment $L_{25}$, and an angle γ(°) formed by the line segment $L_{25}$ and the line segment $L_{36}$ is as indicated in Expression (2) below.

$$\beta < \alpha \approx \gamma \qquad \text{Expression (2)}$$

In the vicinity of the magnetic pole portion pair 32c-1 of the first spoke 32b-1, the magnetic pole portion 32c-1x at the first side (clockwise direction x side) has a smaller region where the magnetic flux tends to pass and has a larger magnetic resistance Rm (reference sign H) due to the effect of the crimped portion 32d located at a position offset toward the clockwise direction x side in the circumferential directions xy. However, the magnetic pole portion 32c-1y at the second side (anticlockwise direction y side) is not significantly affected by the crimped portion 32d, and the region where the magnetic flux tends to pass is large and the magnetic resistance Rm is small (reference sign L). Also, as with the first spoke 32b-1, regarding the fourth spoke 32b-4 at a position point-symmetric with respect to the shaft 30, the magnetic resistance Rm of the magnetic pole portion 32c-4x is large (reference sign H) and the magnetic resistance Rm of the magnetic pole portion 32c-1y is small (reference sign L).

In the vicinity of the magnetic pole portion pair 32c-2 of the second spoke 32b-2, the magnetic pole portion 32c-2y at the second side (anticlockwise direction y side) has a smaller region where the magnetic flux tends to pass and has a larger magnetic resistance Rm (reference sign H) due to the effect of the crimped portion 32d located at a position offset toward the anticlockwise direction y side in the circumferential directions xy. However, the magnetic pole portion 32c-2x at the first side (clockwise direction x side) is not significantly affected by the crimped portion 32d, and the region where the magnetic flux tends to pass is large and the magnetic resistance Rm is small (reference sign L). On the other hand, as with the second spoke 32b-2, regarding the fifth spoke 32b-5 at a position point-symmetric with respect to the shaft 30, the magnetic resistance Rm of the magnetic pole portion 32c-5y is large (reference sign H) and the magnetic resistance Rm of the magnetic pole portion 32c-5x is small (reference sign L).

In the vicinity of the magnetic pole portion pair 32c-3 of the third spoke 32b-3, the effect of the crimped portion 32d not offset and located centrally in the circumferential directions xy is roughly equal at the first side (clockwise direction x side) and the second side (anticlockwise direction y side) in the circumferential directions xy. Thus, the magnetic resistances Rm of the magnetic pole portion 32c-3x and the magnetic pole portion 32c-3y are both medium (reference sign M). Also, as with the third spoke 32b-3, regarding the sixth spoke 32b-6 at a position point-symmetric with respect to the shaft 30, the magnetic resistances Rm of the magnetic pole portion 32c-6x and the magnetic pole portion 32c-6y are both medium (reference sign M).

In the present embodiment, for the magnetic pole portion pairs 32c-○ of the four spokes 32b-○ (○ corresponds to 1, 2, 4, or 5 and the same also applies to the present embodiment hereinafter) from among the six spokes 32b-1 to 32b-6, the magnetic resistances Rm of the magnetic pole portions 32c-○x at the first side (clockwise direction x side) in the circumferential directions xy are different from the magnetic resistances Rm of the magnetic pole portions 32c-○y at the second side (anticlockwise direction y side) in the circumferential directions xy. Thus, in the present embodiment, the magnetic balance in the circumferential directions is upset, and an increase in cogging torque can be achieved.

Also, in the present embodiment, of the magnetic pole portion pair 32c-2 of the second spoke 32b-2, the magnetic pole portion 32c-2y at the second side in the circumferential directions xy (anticlockwise direction y side) has a larger magnetic resistance Rm than the magnetic pole portion 32c-2x at the first side in the circumferential directions xy (clockwise direction x side).

Thus, as illustrated in FIG. 7, at a slot $3S_{12}$ between the first spoke 32b-1 and the second spoke 32b-2, the magnetic pole portion 32c-1x and the magnetic pole portion 32c-2y both with a large magnetic resistance Rm (reference sign H) are located close to one another. In this manner, the cogging torque can be further increased by disposing magnetic pole portions having a large magnetic resistance Rm close to one another at at least one slot (condition A).

Thus, in the present embodiment, the magnetic resistance Rm (reference sign M) of the magnetic pole portion 32c-3y at the second side in the circumferential directions xy (anticlockwise direction y side) of the magnetic pole portion pair 32c-3 of the third spoke 32b-3 adjacent to the second spoke 32b-2 at the first side (clockwise direction x side) in the circumferential directions xy is less than the magnetic resistance Rm (reference sign H) of the magnetic pole portion 32c-2y at the second side in the circumferential directions xy (anticlockwise direction y side) of the magnetic pole portion pair 32c-2 of the second spoke 32b-2.

Thus, as illustrated in FIG. 7, at a slot $3S_{23}$ between the second spoke 32b-2 and the third spoke 32b-3, the magnetic pole portion 32c-2x with a small magnetic resistance Rm and the magnetic pole portion 32c-3y with a medium magnetic resistance Rm are located close to one another. That is, at the slot $3S_{23}$ directly adjacent to the slot $3S_{12}$ between the first spoke 32b-1 and the second spoke 32b-2 where the magnetic pole portion 32c-1x and the magnetic pole portion 32c-2y both with a large magnetic resistance Rm are located close to one another, the magnetic pole portion 32c-2x and the magnetic pole portion 32c-3y with a relatively small magnetic resistance Rm are located close to one another. In this manner, when sections with a large magnetic resistance Rm and a small magnetic resistance Rm are located close to one another in the circumferential directions xy, the magnetic balance is upset to a further greater degree.

In this manner, regarding the circumferentially contiguous two slots $3S_{12}$ and $3S_{23}$, the magnetic pole portions both with a large magnetic resistance Rm (reference sign H) are located close to one another at the slot $3S_{12}$ and the magnetic pole portion with a small magnetic resistance Rm (reference sign L) and the magnetic pole portion with a medium magnetic resistance Rm (reference sign M) are located close to one another at the slot $3S_{23}$ (condition B). Thus, it is possible to even further increase the cogging torque.

Furthermore, in the present embodiment, the number of the spokes of the rotor core 32 is an even number, and, at the magnetic pole portion pair 32c-4 of the fourth spoke 32b-4 at a position point-symmetric to the first spoke 32b-1 with respect to the shaft 30, the magnetic resistance Rm of the magnetic pole portion 32c-4y is small (reference sign L) and the magnetic resistance Rm of the magnetic pole portion 32c-4x is large (reference sign H).

Also, at the magnetic pole portion pair 32c-5 of the fifth spoke 32b-5 at a position point-symmetric to the second spoke 32b-2 with respect to the shaft 30, the magnetic resistance Rm of the magnetic pole portion 32c-5x is small (reference sign L) and the magnetic resistance Rm of the magnetic pole portion 32c-5y is large (reference sign H).

Thus, as illustrated in FIG. 7, at a slot $3S_{45}$ between the fourth spoke 32b-4 and the fifth spoke 32b-5 at a position point-symmetric to the slot $3S_{12}$ between the first spoke 32b-1 and the second spoke 32b-2 with respect to the shaft 30, the magnetic pole portion 32c-4x and the magnetic pole portion 32c-5y both with a large magnetic resistance Rm are located close to one another.

Thus, as described above, also at a slot $3S_{12}$ between the first spoke 32b-1 and the second spoke 32b-2, the magnetic pole portion 32c-1x and the magnetic pole portion 32c-2y both with a large magnetic resistance Rm are located close to one another. Thus, the slots where magnetic pole portions with a large magnetic resistance Rm are located close to one another in the circumferential directions xy are located point-symmetrically.

In this manner, in the present embodiment, because the slots where magnetic pole portions with a large magnetic resistance Rm are located close to one another are located point-symmetrically (condition C), the cogging torque can be multiplicatively increased.

Fourth Embodiment

Next, a motor according to a fourth embodiment being an example of the present invention will be described with reference to the drawings. The motor according to the fourth embodiment has a similar configuration as the configuration of the motor 1 according to the first embodiment, except that the shape of the rotor core is different. Thus, the present embodiment will be described using FIG. 8 being a transverse cross-sectional view of only an extracted rotor core (core) 42 and the extracted shaft 30.

However, in the present embodiment, the number of the spokes of the rotor core is different from the number of the spokes of the motor 1 according to the first embodiment, and accordingly the motor according to the present embodiment is different from the motor 1 according to the first embodiment in terms of the magnet, the circuit structure of the control substrate, and the like. These differences hardly change the external appearance and are not characteristic of the present invention or the present embodiment, and thus FIGS. 1 and 2 can be referred to for other configurations and the overall configuration of the motor according to the present embodiment. The same applies to the subsequent embodiments.

In addition, as in the first embodiment and the second embodiment, in the present embodiment, for adjustment of the magnetic resistances Rm of the pair of magnetic pole portions of each spoke, an offset in the circumferential directions xy of a groove portion provided at a surface of the magnetic pole portion pair opposing the magnet 11 is used. Because the same principle is utilized, no redundant description will be given in the present embodiment, an offset in the circumferential directions xy of the groove portion will not be described, and only the magnitude (large (reference sign H), small (reference sign L), or medium (reference sign M)) of the magnetic resistances Rm of the magnetic pole portions obtained as the result will be described. The same applies to the subsequent embodiments. Of course, the magnetic resistances Rm of the pair of magnetic pole portions may be adjusted by any method such as the method of offsetting the position of the crimped portion in the circumferential directions xy as described in the third embodiment. The same also applies to the subsequent embodiments.

In the present embodiment, the rotor core 42 includes an annular portion 42a surrounding the shaft 30 and five spokes 42b-1 to 42b-5 extending in the radial direction (radially) from the annular portion 42a with the shaft 30 as the axis. The rotor core 42 also includes a pair of magnetic pole portions (magnetic pole portion pairs 42c-1 to 42c-5) extending both directions of the circumferential directions xy and located at the end portion in the radial directions mn (specifically, the outward direction m) of each of the odd number (five) of spokes 42b-1 to 42b-5. Note that a rotor coil (coil) is wound around each of the five spokes 42b-1 to 42b-5, but the rotor coil is omitted from FIG. 8. The same applies to FIG. 9 of the fifth embodiment.

Figure 8:
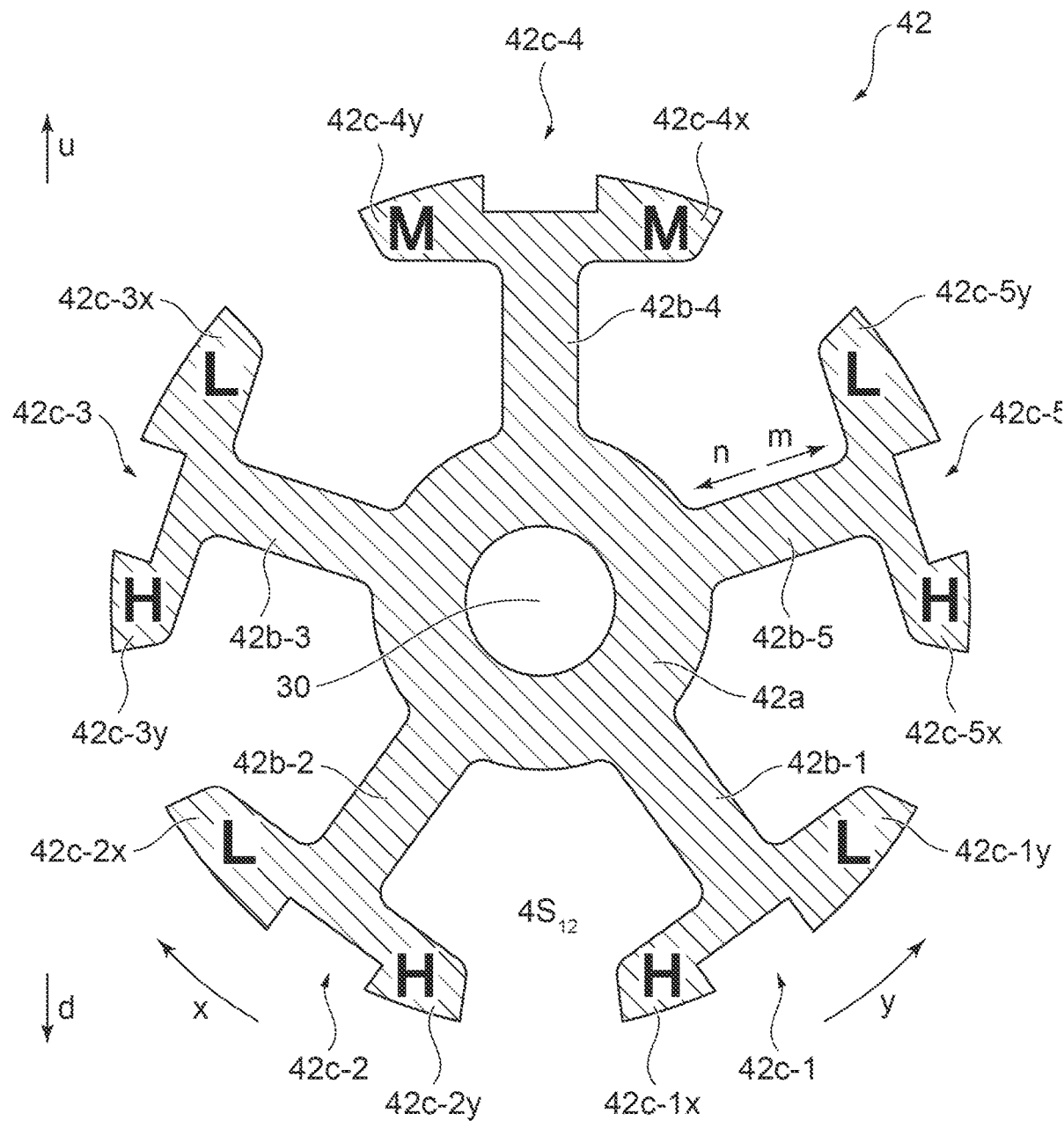
FIG. 8 is a transverse cross-sectional view of only a rotor core and a shaft extracted from a motor according to a fourth embodiment.
Figure 9:
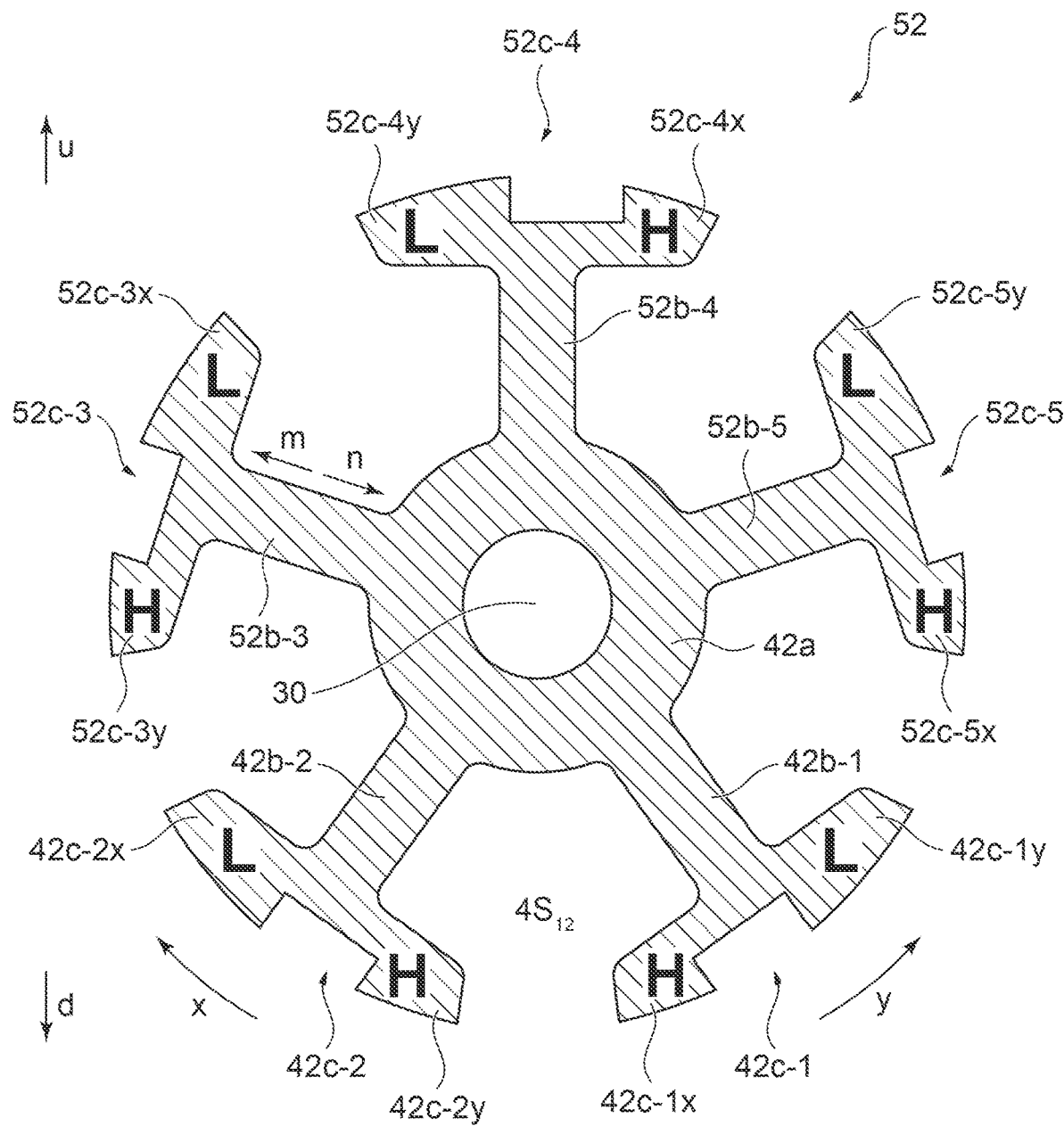
FIG. 9 is a transverse cross-sectional view of only a rotor core and a shaft extracted from a motor according to a fifth embodiment.

First, in FIG. 8, of the two spokes extending from the annular portion 42a in the downward direction d, the spoke at the anticlockwise direction y side is defined as a first spoke 42b-1, and the spokes in order from the first spoke 42b-1 in the clockwise direction x are defined as a second spoke 42b-2, a third-a spoke 42b-3, a fourth-a spoke 42b-4, and a fifth-a spoke 42b-5.

In the present embodiment, in the first spoke 42b-1, the magnetic resistance Rm (reference sign H) of the magnetic pole portion 42c-1x at the first side in the circumferential directions xy (clockwise direction x side) is larger than the magnetic resistance Rm (reference sign L) of the magnetic pole portion 42c-1y at the second side in the circumferential directions xy (anticlockwise direction y side).

Also, in the second spoke 42b-2, the magnetic resistance Rm (reference sign H) of the magnetic pole portion 42c-2y at the second side in the circumferential directions xy (anticlockwise direction y side) is larger than the magnetic resistance Rm (reference sign L) of the magnetic pole portion 42c-2x at the first side in the circumferential directions xy (clockwise direction x side).

Also, in the third-a spoke 42b-3, the magnetic resistance Rm (reference sign H) of the magnetic pole portion 42c-3y at the second side in the circumferential directions xy (anticlockwise direction y side) is larger than the magnetic resistance Rm (reference sign L) of the magnetic pole portion 42c-3x at the first side in the circumferential directions xy (clockwise direction x side).

Also, in the fifth-a spoke 42b-5, the magnetic resistance Rm (reference sign H) of the magnetic pole portion 42c-5x at the first side in the circumferential directions xy (clockwise direction x side) is larger than the magnetic resistance Rm (reference sign L) of the magnetic pole portion 42c-5y at the second side in the circumferential directions xy (anticlockwise direction y side).

Also, in the magnetic pole portion pair 42c-4 of the fourth-a spoke 42b-4, the magnetic resistances Rm of both the magnetic pole portions 42c-4x and 42c-4y at the first side (clockwise direction x side) and the second side (anticlockwise direction y side) in the circumferential directions xy are roughly equal (reference sign M).

In the present embodiment, as illustrated in FIG. 8, for the magnetic pole portion pairs 42c-○ of the four spokes 42b-○ (○ corresponds to 1, 2, 3, or 5 and the same also applies to the present embodiment described below) from among the five spokes 42b-1 to 42b-5, the magnetic resistances Rm of the magnetic pole portions 42c-○x at the first side (clockwise direction x side) in the circumferential directions xy are different from the magnetic resistances Rm of the magnetic pole portions 42c-○y at the second side (anticlockwise direction y side) in the circumferential directions xy. Thus, in the present embodiment, the magnetic balance in the circumferential directions is upset, and an increase in cogging torque can be achieved.

Also, in the present embodiment, as illustrated in FIG. 8, at a slot $4S_{12}$ between the first spoke 42b-1 and the second spoke 42b-2, the magnetic pole portion 42c-1x and the magnetic pole portion 42c-2y both with a large magnetic resistance Rm (reference sign H) are located close to one another. As described above, the cogging torque can be further increased by disposing magnetic pole portions having a large magnetic resistance Rm close to one another at at least one slot (condition A).

In the present embodiment, because the number of the spokes of the rotor core is an odd number, the condition C described in the first embodiment is not satisfied. However, the present embodiment is preferable because, as described below, a condition (condition D) for further increasing the cogging torque is satisfied, the condition (condition D) being particular in a case where the number of the spokes is an odd number.

First, in the present embodiment, the magnetic resistances of both the magnetic pole portions 42c-4x and 42c-4y of the magnetic pole portion pair 42c-4 of the fourth-a spoke 42b-4 at a position point-symmetric to the slot $4S_{12}$ between the first spoke 42b-1 and the second spoke 42b-2 with respect to the shaft 30 are substantially equal (condition D-1).

Additionally, in the present embodiment, the magnetic resistance Rm (reference sign L) of at least one of (both in the present embodiment) the magnetic pole portion 42c-3x of the magnetic pole portion pair 42c-3 of the third-a spoke 42b-3 at a side of the fourth-a spoke 42b-4 in the circumferential directions and the magnetic pole portion 42c-5y of the magnetic pole portion pair 42c-5 of the fifth-a spoke 42b-5 at a side of the fourth-a spoke 42b-4 in the circumferential directions is less than the magnetic resistance Rm (reference sign M for both 42c-4x and 42c-4y) of one of the magnetic pole portions of the magnetic pole portion pair 42c-4 of the fourth-a spoke 42b-4 (condition D-2).

Condition D corresponds to satisfying condition D-1 and condition D-2 described above, and condition D is satisfied in the present embodiment. Note that regarding condition D-2, the mode of the present embodiment in which both the magnetic pole portion 42c-3x and the magnetic pole portion 42c-5y have a smaller magnetic resistance Rm than the magnetic pole portion 42c-4x(≈42c-4y) is particularly preferable.

In this manner, in the present embodiment, the magnetic resistance Rm is made small at at least one side of the spoke at a position point-symmetric to the slot $4S_{12}$ where both magnetic pole portions with a large magnetic resistance Rm are located close to one another. Thus, the magnet balance in the circumferential directions xy is further upset, and presumably the cogging torque is even further increased.

Fifth Embodiment

Next, a motor according to a fifth embodiment being an example of the present invention will be described with reference to the drawings. The motor according to the fifth embodiment has a similar configuration as the configuration of the motor 1 according to the first embodiment, except that the shape of the rotor core is different. Thus, the present embodiment is described using FIG. 9 being a transverse cross-sectional view of only an extracted rotor core (core) 52 and the extracted shaft 30.

In addition, in the rotor core 52 of the present embodiment, only the magnetic pole portion pair (reference signs 52c-4 in FIG. 9) corresponding to the magnetic pole portion pair 42c-4 of the fourth-a spoke 42b-4, from among the five spokes 42b-1 to 42b-5 in the fourth embodiment, has a different shape, and otherwise the rotor core 52 has the same shape and structure as the rotor core 42 according to the fourth embodiment. Thus, in the present embodiment illustrated in FIG. 9, members having the same configuration as the members of the fourth embodiment are given the same reference signs, and detailed descriptions of the members will be omitted.

Note that the third-b spoke 52b-3 and the fifth-b spoke 52b-5 in the present embodiment have the same configuration as the third-a spoke 42b-3 and the fifth-a spoke 42b-5 in the fourth embodiment. However, for the sake of description, these spokes are given reference signs (52b-3 and 52b-5) particular to the present embodiment. The same applies to members (magnetic pole portions, magnetic pole portion pairs, and the like) associated with the third-b spoke 52b-3 and the fifth-b spoke 52b-5.

In the present embodiment, in the magnetic pole portion pair 52c-4 of the fourth-b spoke 52b-4, the magnetic resistance Rm (reference sign H) of the magnetic pole portion 52c-4x at the first side in the circumferential directions xy (clockwise direction x side) is larger than the magnetic resistance Rm (reference sign L) of the magnetic pole portion 52c-4y at the second side in the circumferential directions xy (anticlockwise direction y side).

In other words, in the magnetic pole portion pair 42c-4 of the fourth-a spoke 42b-4 in the fourth embodiment, the magnetic resistances Rm of both the magnetic pole portions 42c-4x and 42c-4y at the first side (clockwise direction x side) and the second side (anticlockwise direction y side) in the circumferential directions xy are roughly equal (reference sign M). However, in the present embodiment, the magnetic resistances Rm of the magnetic pole portions 52c-4x and 52c-4y are different from one another.

In the present embodiment, for all of the magnetic pole portion pairs 42c-Δ and 52c-☐ of the five spokes 42b-Δ (Δ corresponds to 1 or 2 and the same also applies to the present embodiment described below) and 52b-☐ (☐ corresponds to one of 3 to 5 and the same also applies to the present embodiment described below), the magnetic resistances Rm of the magnetic pole portions 42c-Δx and 52c-☐x at the first side (clockwise direction x side) in the circumferential directions xy are different from the magnetic resistances Rm of the magnetic pole portions 42c-Δy and 52c-☐y at the second side (anticlockwise direction y side) in the circumferential directions xy. Thus, in the present embodiment, the magnetic balance in the circumferential directions is upset, and an increase in cogging torque can be achieved in a similar manner to the fourth embodiment.

Also, at the slot $4S_{12}$ between the first spoke 42b-1 and the second spoke 42b-2, the magnetic pole portion 42c-1x and the magnetic pole portion 42c-2y both with a large magnetic resistance Rm are located close to one another, and at at least one slot, both magnetic pole portions with a large magnetic resistance Rm are located close to one another (condition A). Thus, the cogging torque can be further increased in a similar manner to the fourth embodiment.

In the present embodiment, because the number of the spokes of the rotor core is an odd number, the condition C described in the first embodiment is not satisfied. Also, condition D particular to a case where the number of the spokes is an odd number as described in the fourth embodiment is also not satisfied. However, the present embodiment is preferable because, as described below, another condition (condition E) for further increasing the cogging torque is satisfied, the condition (condition E) being particular to a case where the number of the spokes is an odd number.

First, in the present embodiment, the magnetic resistance Rm (reference sign H) of the magnetic pole portion 52c-4x at the first side (clockwise direction x side) in the circumferential directions xy of the magnetic pole portion pair 52c-4 of the fourth-b spoke 52b-4 at a position point-symmetric to the slot $4S_{12}$ between the first spoke 42b-1 and the second spoke 42b-2 with respect to the shaft 30 is larger than the magnetic resistance Rm (reference sign L) of the magnetic pole portion 52c-4y at the opposite side (condition E-1).

Additionally, in the present embodiment, of the magnetic pole portion pair 52c-3 of the third-b spoke 52b-3 adjacent to the fourth-b spoke 52b-4 at the side of the magnetic pole portion 52c-4y with a small magnetic resistance Rm of the magnetic pole portion pair 52c-4 of the fourth-b spoke 52b-4, the magnetic resistance Rm (reference sign L) of the magnetic pole portion 52c-3x at a side of the fourth-b spoke 52b-4 in the circumferential directions xy is less than the magnetic resistance Rm (reference sign H) of the magnetic pole portion 42c-1x at the first side (clockwise direction x side) of the magnetic pole portion pair 42c-1 of the first spoke 42b-1 (condition E-2).

Condition E corresponds to satisfying condition E-1 and condition E-2 described above, and condition E is satisfied in the present embodiment.

In this manner, in the present embodiment, at the slot between the spoke point-symmetric to the slot $4S_{12}$ where the magnetic pole portions with a large magnetic resistance Rm are located close to one another and the adjacent spoke, the magnetic pole portions with a small magnetic resistance Rm (in the present embodiment, the magnetic pole portion 52c-3x has a small magnetic resistance Rm (reference sign L) but may have a medium magnetic resistance Rm (reference sign M)) are located close to one another. Thus, because the magnetic balance in the circumferential directions xy is even further upset, and presumably the cogging torque is even further increased.

Sixth Embodiment

Next, a motor according to a sixth embodiment being an example of the present invention will be described with reference to the drawings. The motor according to the sixth embodiment has a similar configuration as the configuration of the motor 1 according to the first embodiment, except that the shape of the rotor core is different. Thus, the present embodiment will be described using FIG. 10 being a transverse cross-sectional view of only a rotor core (core) 62 and the shaft 30.

However, in the present embodiment, the number of the spokes of the rotor core is different from the number of the spokes of the motor 1 according to the first embodiment, and accordingly the motor according to the present embodiment is different from the motor 1 according to the first embodiment in terms of the magnet, the circuit structure of the control substrate, and the like.

In the present embodiment, the rotor core 62 includes an annular portion 62a surrounding the shaft 30 and eleven spokes 62b-1 to 62b-11 extending in the radial direction (radially) from the annular portion 62a with the shaft 30 as the axis. The rotor core 62 also includes a pair of magnetic pole portions (magnetic pole portion pairs 62c-1 to 62c-11) extending both directions of the circumferential directions xy and located at the end portion in the radial directions mn (specifically, the outward direction m) of each of the odd number (eleven) of spokes 62b-1 to 62b-11. Note that a rotor coil (coil) is wound around each of the eleven spokes 62b-1 to 62b-11, but the rotor coil is omitted from FIG. 10. The same applies to FIG. 11 of the seventh embodiment.

Figure 10:
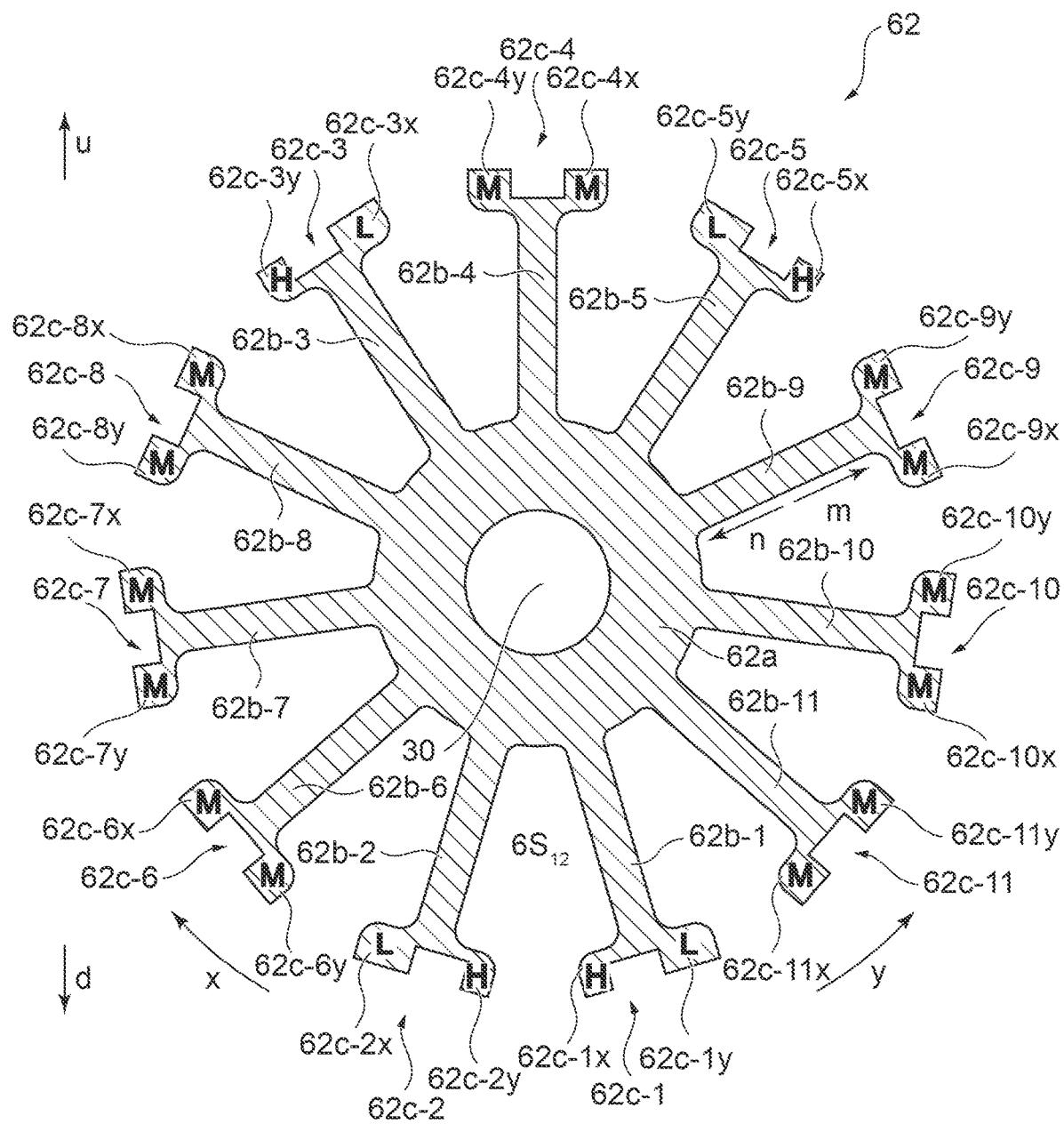
FIG. 10 is a transverse cross-sectional view of only a rotor core and a shaft extracted from a motor according to a sixth embodiment.

First, in FIG. 10, of the two spokes extending from the annular portion 62a in the downward direction d, the spoke at the anticlockwise direction y side is defined as a first spoke 62b-1, and the spokes in order from the first spoke 62b-1 in the clockwise direction x are defined as a second spoke 62b-2, a sixth spoke 62b-6, a seventh spoke 62b-7, an eighth spoke 62b-8, a third-a spoke 62b-3, a fourth-a spoke 62b-4, a fifth-a spoke 62b-5, a ninth spoke 62b-9, a tenth spoke 62b-10, and an eleventh spoke 62b-11.

In the present embodiment, in the first spoke 62b-1, the magnetic resistance Rm (reference sign H) of the magnetic pole portion 62c-1x at the first side in the circumferential directions xy (clockwise direction x side) is larger than the magnetic resistance Rm (reference sign L) of the magnetic pole portion 62c-1y at the second side in the circumferential directions xy (anticlockwise direction y side).

Also, in the second spoke 62b-2, the magnetic resistance Rm (reference sign H) of the magnetic pole portion 62c-2y at the second side in the circumferential directions xy (anticlockwise direction y side) is larger than the magnetic resistance Rm (reference sign L) of the magnetic pole portion 62c-2x at the first side in the circumferential directions xy (clockwise direction x side).

Also, in the third-a spoke 62b-3, the magnetic resistance Rm (reference sign H) of the magnetic pole portion 62c-3y at the second side in the circumferential directions xy (anticlockwise direction y side) is larger than the magnetic resistance Rm (reference sign L) of the magnetic pole portion 62c-3x at the first side in the circumferential directions xy (clockwise direction x side).

Also, in the fifth-a spoke 62b-5, the magnetic resistance Rm (reference sign H) of the magnetic pole portion 62c-5x at the first side in the circumferential directions xy (clockwise direction x side) is larger than the magnetic resistance Rm (reference sign L) of the magnetic pole portion 62c-5y at the second side in the circumferential directions xy (anticlockwise direction y side).

Also, in the magnetic pole portion pair 62c-4 of the fourth-a spoke 62b-4, the magnetic resistances Rm of both the magnetic pole portions 62c-4x and 62c-4y at the first side (clockwise direction x side) and the second side (anticlockwise direction y side) in the circumferential directions xy are roughly equal (reference sign M).

In the present embodiment, in the magnetic pole portion pairs 62c-6 to 62c-11 of the remaining sixth spoke 62b-6 to the eleventh spoke 62b-11, the magnetic resistances Rm of the magnetic pole portions 62c-6x to 62c-11x and 62c-6y to 62c-11y at the first side (clockwise direction x side) and the second side (anticlockwise direction y side) in the circumferential directions xy are roughly equal (reference sign M).

In the present embodiment, as illustrated in FIG. 10, for the magnetic pole portion pairs 62c-○ of the four spokes 62b-○ (○ corresponds to 1, 2, 3, or 5 and the same also applies to the present embodiment described below) from among the eleven spokes 62b-1 to 62b-11, the magnetic resistances Rm of the magnetic pole portions 62c-○x at the first side (clockwise direction x side) in the circumferential directions xy are different from the magnetic resistances Rm of the magnetic pole portions 62c-○y at the second side (anticlockwise direction y side) in the circumferential directions xy. Thus, in the present embodiment, the magnetic balance in the circumferential directions is upset, and an increase in cogging torque can be achieved.

Also, in the present embodiment, as illustrated in FIG. 10, at a slot $6S_{12}$ between the first spoke 62b-1 and the second spoke 62b-2, the magnetic pole portion 62c-1x and the magnetic pole portion 62c-2y both with a large magnetic resistance Rm are located close to one another. In this manner, the cogging torque can be further increased by disposing magnetic pole portions having a large magnetic resistance Rm close to one another at at least one slot (condition A).

Furthermore, in the present embodiment, the number of the spokes of the rotor core is eleven, and the present embodiment is preferable because condition D particular to a case where the number of the spokes is an odd number is satisfied. In other words, in the present embodiment, the magnetic resistances of both the magnetic pole portions 62c-4x and 62c-4y of the magnetic pole portion pair 62c-4 of the fourth-a spoke 62b-4 point-symmetric to the slot $6S_{12}$ between the first spoke 62b-1 and the second spoke 62b-2 with respect to the shaft 30 are substantially equal (condition D-1).

Additionally, in the present embodiment, the magnetic resistance Rm (reference sign L) of at least one of (both in the present embodiment) the magnetic pole portion 62c-3x of the magnetic pole portion pair 62c-3 of the third-a spoke 62b-3 at a side of the fourth-a spoke 62b-4 in the circumferential directions and the magnetic pole portion 62c-5y of the magnetic pole portion pair 62c-5 of the fifth-a spoke 62b-5 at a side of the fourth-a spoke 62b-4 in the circumferential directions is less than the magnetic resistance Rm (reference sign M for both 62c-4x and 62c-4y) of one of the magnetic pole portions of the magnetic pole portion pair 62c-4 of the fourth-a spoke 62b-4 (condition D-2).

In the present embodiment, condition D-1 and condition D-2 are satisfied, and thus condition D is satisfied. Note that regarding condition D-2, the mode of the present embodiment in which both the magnetic pole portion 62c-3x and the magnetic pole portion 62c-5y have a smaller magnetic resistance Rm than the magnetic pole portion 62c-4x ($\approx$62c-4y) is particularly preferable.

In this manner, in the present embodiment, the magnetic resistance Rm is made small at at least one side of the spoke at a position point-symmetric to the slot $6S_{12}$ where both magnetic pole portions with a large magnetic resistance Rm are located close to one another. Thus, the magnet balance in the circumferential directions xy is further upset, and presumably the cogging torque is further increased.

Seventh Embodiment

Next, a motor according to a seventh embodiment being an example of the present invention will be described with reference to the drawings. The motor according to the seventh embodiment has a similar configuration as the configuration of the motor 1 according to the first embodiment, except that the shape of the rotor core is different. Thus, the present embodiment will be described using FIG. 11 being a transverse cross-sectional view of only a rotor core (core) 72 and the shaft 30.

In addition, in the rotor core 72 of the present embodiment, only the magnetic pole portion pairs (reference signs 72c-3 and 72c-4 in FIG. 11) corresponding to the magnetic pole portion pairs 62c-3 and 62c-4 of the third-a spoke 62b-3 and the fourth-a spoke 62b-4, from among the eleven spokes 62b-1 to 62b-11 in the sixth embodiment, have a different shape, and otherwise the rotor core 72 has the same shape and structure as the rotor core 62 according to the sixth embodiment. Thus, in the present embodiment illustrated in FIG. 11, members having the same configuration as the members of the sixth embodiment are given the same reference signs, and detailed descriptions of the members will be omitted.

Note that the fifth-b spoke 72b-5 in the present embodiment have the same configuration as the fifth-a spoke 62b-5 in the sixth embodiment. However, for the sake of description, a reference sign (72b-5) particular to the present embodiment is given. The same applies to members (magnetic pole portions, magnetic pole portion pairs, and the like) associated with the fifth-b spoke 72b-5.

In the present embodiment, in the magnetic pole portion pair 72c-4 of the fourth-b spoke 72b-4, the magnetic resistance Rm (reference sign H) of the magnetic pole portion 72c-4x at the first side in the circumferential directions xy (clockwise direction x side) is larger than the magnetic resistance Rm (reference sign L) of the magnetic pole portion 72c-4y at the second side in the circumferential directions xy (anticlockwise direction y side).

Also, in the magnetic pole portion pair 72c-3 of the third-b spoke 72b-3, the magnetic resistances Rm of both the magnetic pole portions 72c-3x and 72c-3y at the first side (clockwise direction x side) and the second side (anticlockwise direction y side) in the circumferential directions xy are roughly equal (reference sign M).

Figure 11:
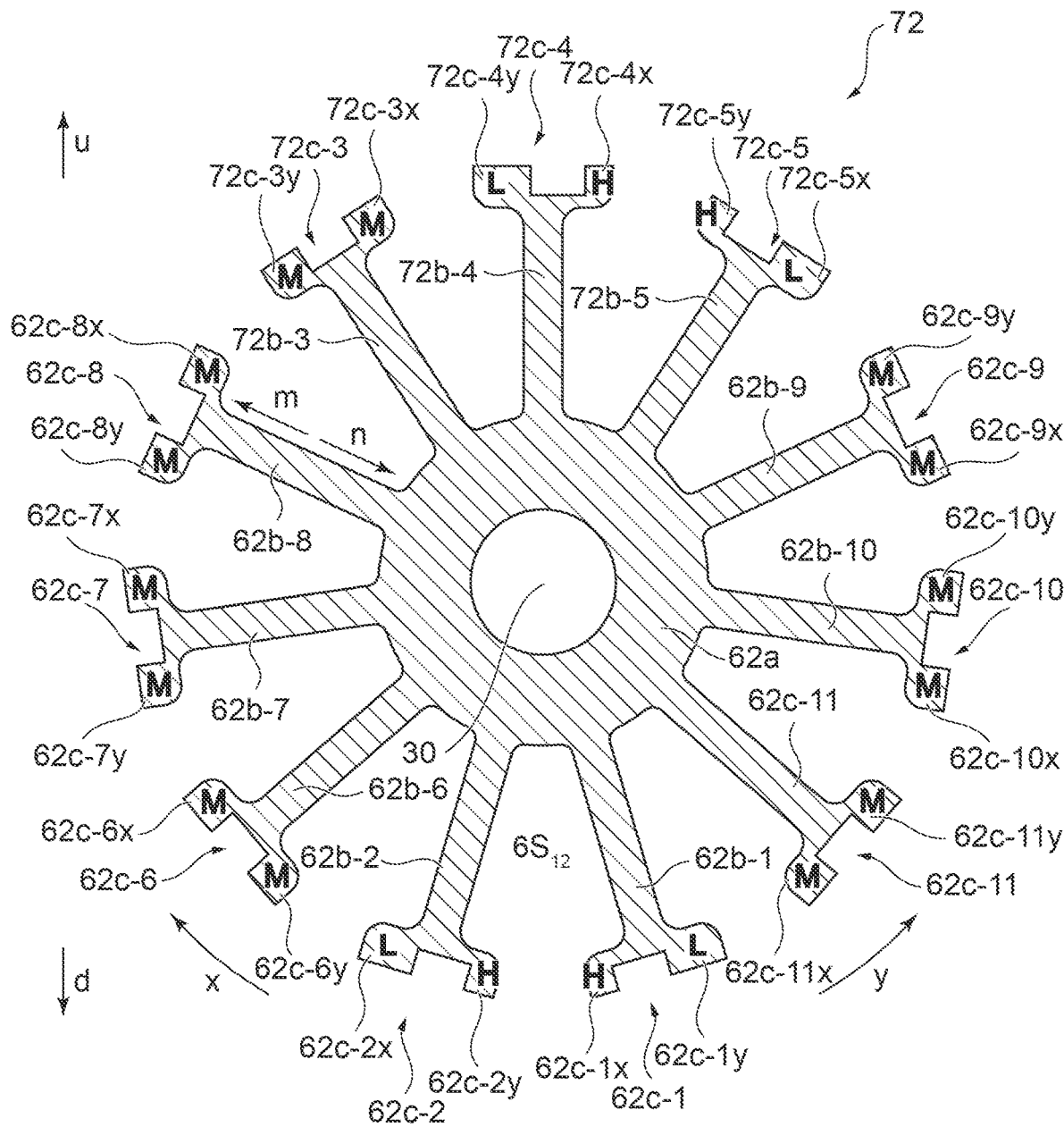
FIG. 11 is a transverse cross-sectional view of only a rotor core and a shaft extracted from a motor according to a seventh embodiment.

In the present embodiment, as illustrated in FIG. 11, for the four spokes 62b-Δ (Δ corresponds to 1 or 2 and the same also applies to the present embodiment described below) and 72b-□ of the eleven spokes 62b-○ (○ corresponds to a number from 1 to 11 (excluding from 3 to 5) and the same also applies to the present embodiment described below), 72b-3 and 72b-□ (□ corresponding to 4 or 5 and the same also applies to the present embodiment described below), the magnetic resistances Rm of the magnetic pole portions 62c-Δx and 72c-□x at the first side (clockwise direction x side) in the circumferential directions xy are different from the magnetic resistances Rm of the magnetic pole portions 62c-Δy and 72c-□y at the second side (anticlockwise direction y side) in the circumferential directions xy. Thus, in the present embodiment, the magnetic balance in the circumferential directions is upset, and an increase in cogging torque can be achieved in a similar manner to the sixth embodiment.

Also, at the slot $6S_{12}$ between the first spoke 62b-1 and the second spoke 62b-2, the magnetic pole portion 62c-1x and the magnetic pole portion 62c-2y both with a large magnetic resistance Rm are located close to one another, and at at least one slot, both magnetic pole portions with a large magnetic resistance Rm are located close to one another (condition A). Thus, the cogging torque can be further increased in a similar manner to the sixth embodiment.

Furthermore, in the present embodiment, the number of the spokes of the rotor core is eleven, and the present embodiment is preferable because another condition E particular to a case where the number of the spokes is an odd number is satisfied. In other words, in the present embodiment, the magnetic resistance Rm (reference sign H) of the magnetic pole portion 72c-4x at the first side (clockwise direction x side) in the circumferential directions xy of the magnetic pole portion pair 72c-4 of the fourth-b spoke 72b-4 at a position point-symmetric to the slot $6S_{12}$ between the first spoke 62b-1 and the second spoke 62b-2 with respect to the shaft 30 is larger than the magnetic resistance Rm (reference sign L) of the magnetic pole portion 72c-4y at the opposite side (condition E-1).

Additionally, in the present embodiment, of the magnetic pole portion pair 72c-3 of the third-b spoke 72b-3 adjacent to the fourth-b spoke 72b-4 at the side of the magnetic pole portion 72c-4y with a small magnetic resistance Rm of the magnetic pole portion pair 72c-4 of the fourth-b spoke 72b-4, the magnetic resistance Rm (reference sign M) of the magnetic pole portion 72c-3x at a side of the fourth-b spoke 72b-4 in the circumferential directions xy is less than the magnetic resistance Rm (reference sign H) of the magnetic pole portion 62c-1x at the first side (clockwise direction x side) of the magnetic pole portion pair 62c-1 of the first spoke 62b-1 (condition E-2).

Condition E-1 and condition E-2 are satisfied, and thus condition E is satisfied.

In this manner, in the present embodiment, at the slot between the spoke at a position point-symmetric to the slot $6S_{12}$ where the magnetic pole portions with a large magnetic resistance Rm are located close to one another and the adjacent spoke, the magnetic pole portions with a small magnetic resistance Rm (as in the present embodiment, the magnetic pole portion 72c-3x may have a medium magnetic resistance Rm (reference sign M)) are located close to one another. Thus, because the magnetic balance in the circumferential directions xy is even further upset, and presumably the cogging torque is even further increased.

Eighth Embodiment

Figure 12:
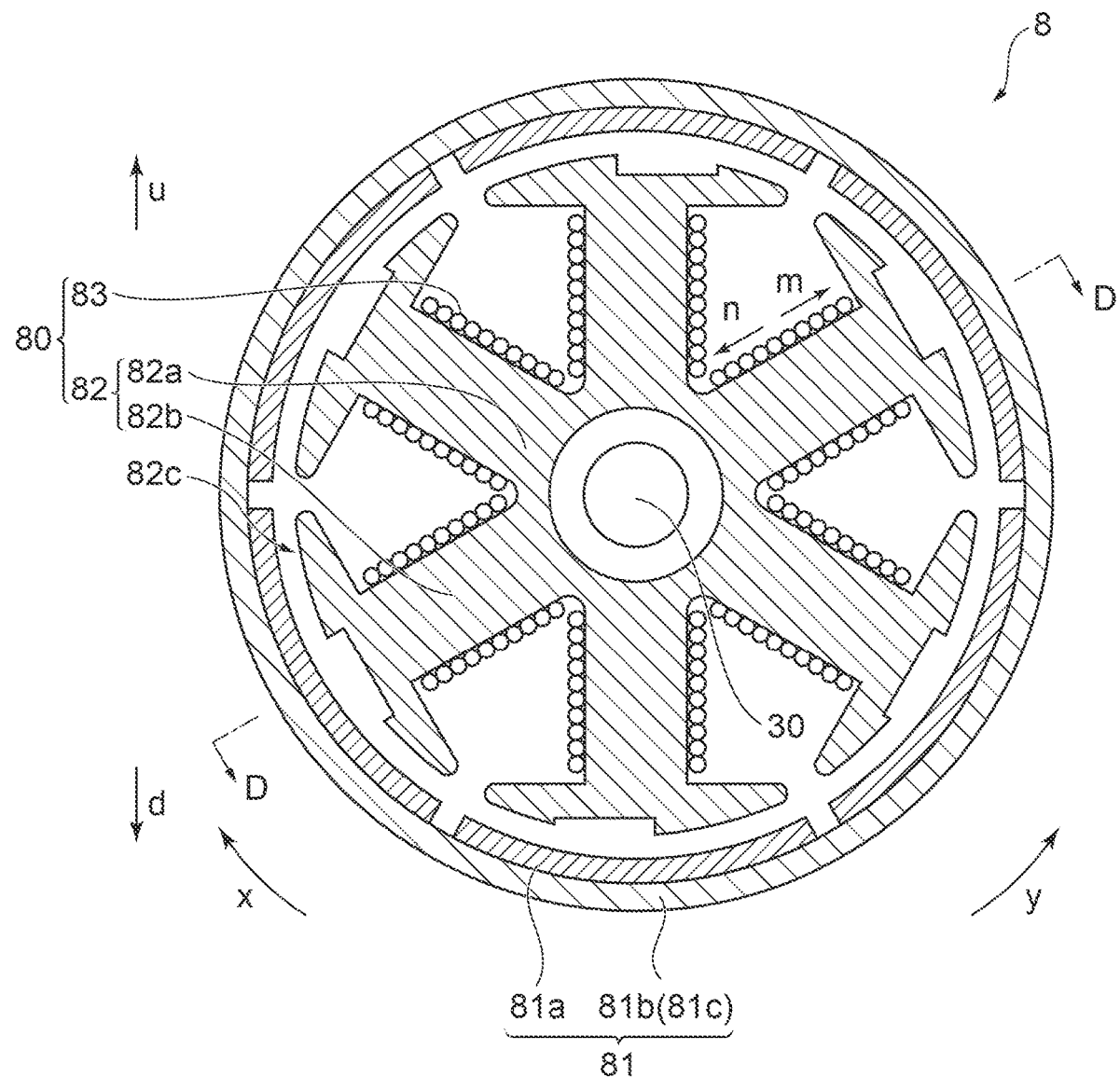
FIG. 12 is a cross-sectional view (transverse cross-sectional view) taken along a plane perpendicular to the direction of a shaft of a motor according to an eighth embodiment being an example of the present invention and is a cross-sectional view taken along C-C in FIG. 13.
Figure 13:
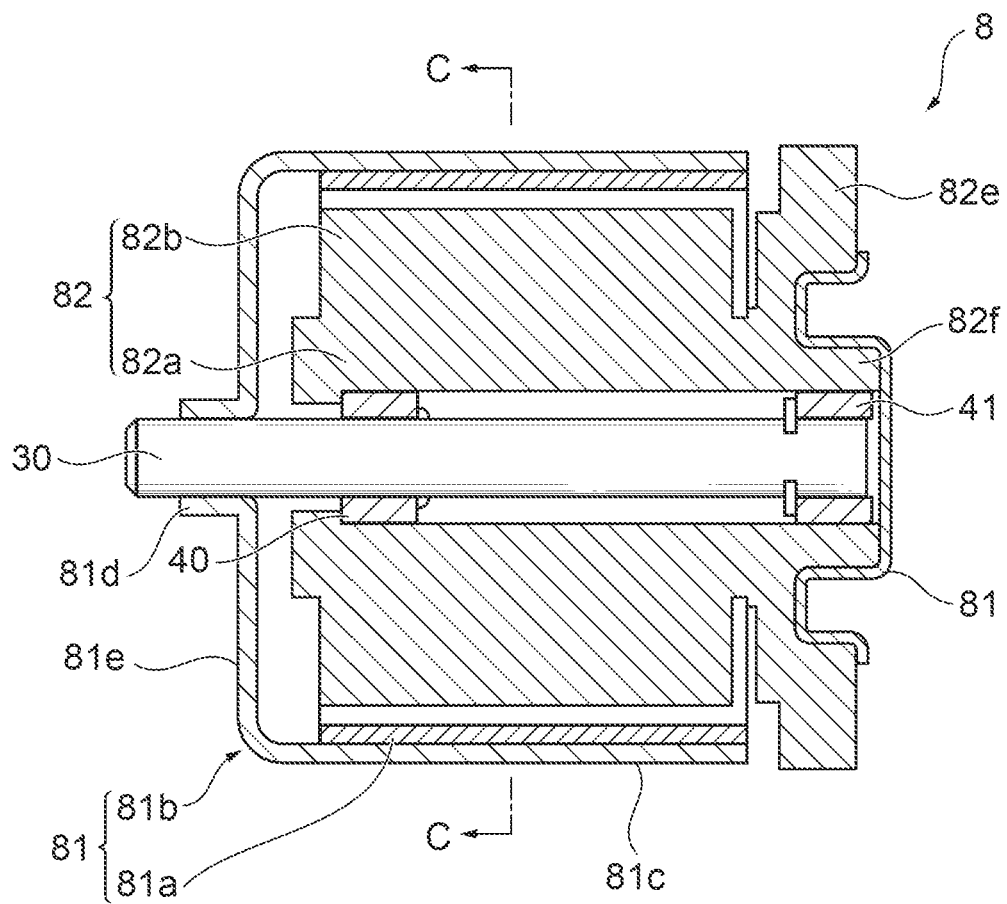
FIG. 13 is a cross-sectional view taken along a plane including the shaft of the motor according to the eighth embodiment and is a cross-sectional view taken along D-D in FIG. 12.

Next, a motor according to an eighth embodiment being an example of the present invention will be described with reference to the drawings. FIG. 12 is a cross-sectional view taken along a plane perpendicular to the direction of the shaft of a motor 8 according to the eighth embodiment. FIG. 13 is a cross-sectional view taken along a plane including the shaft. FIG. 12 is a cross-sectional view taken along line C-C in FIG. 13, and FIG. 13 is a cross-sectional view taken along line D-D in FIG. 12.

In the motor 8 according to the eighth embodiment, a member having a similar configuration as the rotor (rotor core 2 and rotor coil 3) of the motor 1 according to the first embodiment is used as a stator (reference sign 80 in the present embodiment). That is, the motor 1 is an inner rotor type motor, whereas the motor 8 is an outer rotor type motor.

In addition, although there are various differences, such as the shape of the magnet, the configuration of the shaft support, and the like, the motor 8 according to the present embodiment has a configuration similar to the motor 1 according to the first embodiment. Thus, in FIGS. 12 and 13 regarding the present embodiment, members having the same configuration as the members of the first embodiment are given the same reference signs, and detailed descriptions of the members will be omitted.

In the present embodiment, a rotor 81 includes a magnet 81a and a rotor hub 81b. The rotor hub 81b is coaxially disposed with the shaft 30, has an overall cup-like shape, and includes a tubular portion 81c with an inner circumferential surface to which the magnet 81a is attached, a disk portion 81e continuous with the tubular portion 81c at the side in a first direction (left direction in FIG. 13) of the axial direction of the shaft 30, and a tubular connection portion 81d continuous with the disk portion 81e.

The rotor hub 81b is a magnetic body made of a ferrous material or the like, and the shaft 30 inserted into the connection portion 81d is fixed at the connection portion 81d, so that the shaft 30 and the connection portion 81d are integrally formed. Six magnets 81a are disposed at the inner circumferential surface of the cylindrical portion 81c surrounding a stator core 82 described below. The magnets 81a are disposed so that the north and south poles alternately oppose the stator core 82 in the circumferential direction.

The stator core 82 being a portion of a stator 80 made of iron is disposed at the inner side of the magnets 81a with a predetermined gap. In the present embodiment, the stator 80 includes the stator core 82 including an annular portion 82a disposed coaxially with the shaft 30 to surround the shaft 30 and six spokes 82b extending from the annular portion 82a in the radial direction (radially), a stator hub 82e extending from the annular portion 82a in the radial direction (radially) at a side in a second direction (right direction in FIG. 13) of the axial direction of the shaft 30 and increasing in diameter, and a stator coil (coil) 83 wound around each of the six spokes 82b of the stator core 82.

The spokes 82b and the stator hub 82e are connected to the annular portion 82a in this order from the first direction to the second direction (from the left to the right direction in FIG. 13) in the axial direction of the shaft 30, and the annular portion 82a extends further (this extending portion is referred to as an "annular extending portion" and is denoted by the reference sign 82f). A disk-shaped bottom portion 61 is attached to a portion of the annular extending portion 82f and the stator hub 82e. The bottom portion 61 and the stator 80 form a fixing portion.

The shaft 30 is rotatably supported by the first bearing 40 and the second bearing 41 at the first direction (left direction in FIG. 13) side slightly shifted from the center in the axial direction and at the second direction (right direction in FIG. 13) side. The first bearing 40 and the second bearing 41 are fixed at the inner circumferential surface of the annular portion 82a, and the shaft is fixed at the stator 80 via the bearings 40 and 41. That is, the shaft 30 is rotatably fixed at the stator 80. Thus, the rotating portion formed by the shaft 30 and the rotor 81 is configured to be rotatable with respect to the fixing portion formed by the stator 80 and the bottom portion 61.

An energizing mechanism omitted from the drawings is disposed at the stator 80, and a predetermined drive current is supplied to the stator coils 83 wound around the stator core 82 via the energizing mechanism. The mechanical and electrical structures of the stator 80 are the same as the mechanical and electrical structures of a stator of a typical brushless DC motor.

Figure 14:
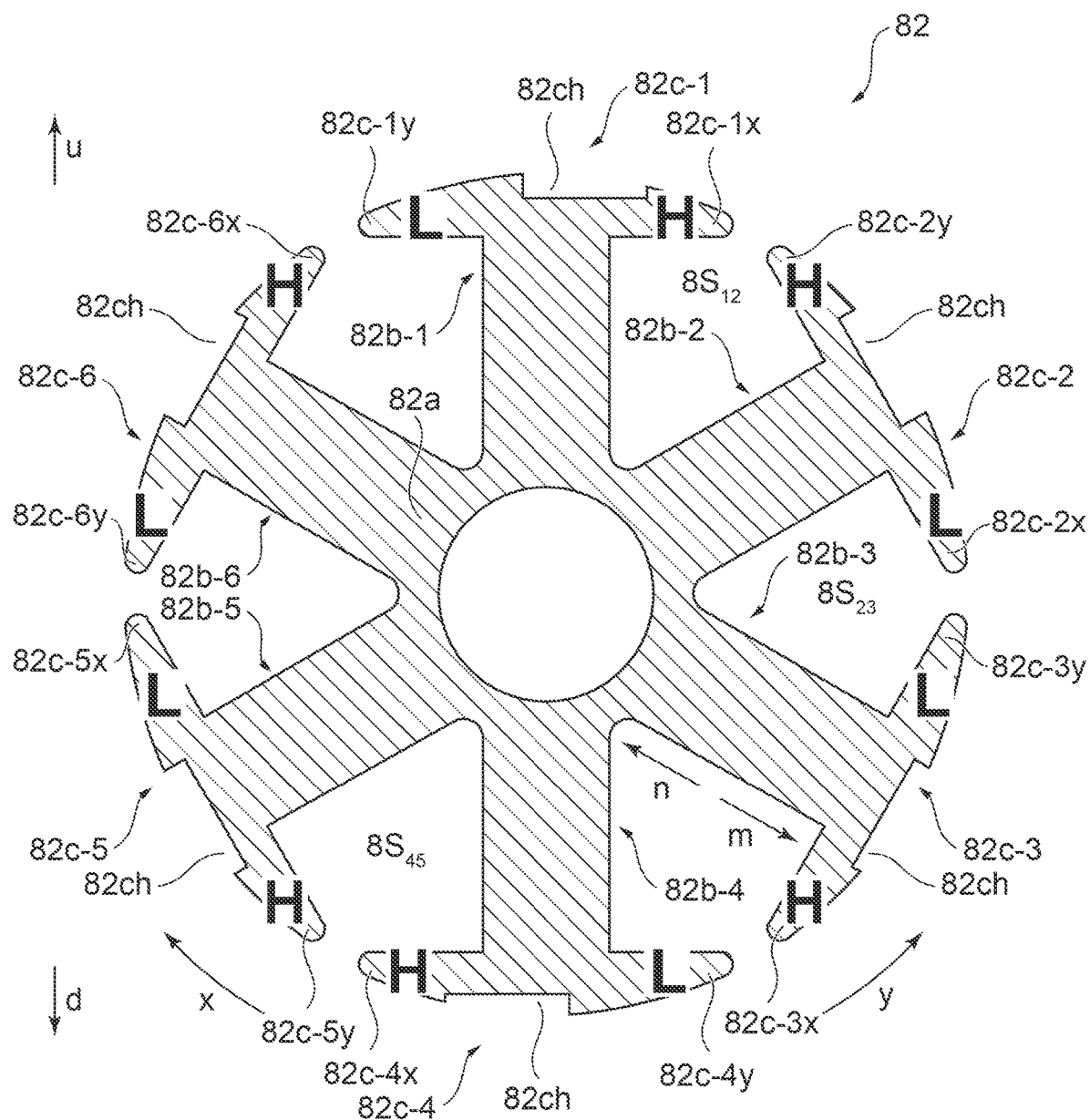
FIG. 14 is a transverse cross-sectional view of only a stator core extracted from the motor according to the eighth embodiment.

FIG. 14 is a transverse cross-sectional view of only the stator core 82 extracted from the motor 8 according to the present embodiment. As can be seen from a comparison with FIG. 3, the shape of the stator core 82 in the present embodiment is similar to the rotor core 2 in the first embodiment. The stator coils 83 (see FIG. 13) of the present embodiment and the rotor coils 3 (see FIG. 1) in the first embodiment have the same configuration, and thus it can be said that the stator 80 in the present embodiment and the rotor 20 in the first embodiment are the same when considered as an individual component.

That is, the stator 80 of the present embodiment and the rotor 20 of the first embodiment can be considered to be the same magnetic member. Thus, the stator 80 and the rotor 20 differ in terms of their function in the motor (8, 9), but are similar in terms of their magnetic characteristics. Thus, the motor 8 according to the present embodiment can achieve the effect of increasing cogging torque in a similar manner to the motor 1 according to the first embodiment.

In the present embodiment, for all of the magnetic pole portion pairs 82c-1 to 82c-6 of the six spokes 82b-1 to 82b-6, the magnetic resistances Rm of the magnetic pole portions 82c-◯x (◯ corresponds to a number from 1 to 6 and the same also applies to the present embodiment described below) at the first side (clockwise direction x side) in the circumferential directions xy are different from the magnetic resistances Rm of the magnetic pole portions 82c-○y at the second side (anticlockwise direction y side) in the circumferential directions xy. Thus, in the present embodiment, the magnetic balance in the circumferential directions is upset, and an increase in cogging torque can be achieved.

Also, in the present embodiment, in the magnetic pole portion pair 82c-2 of the second spoke 82b-2, the magnetic pole portion 82c-2y at the second side in the circumferential directions xy (anticlockwise direction y side) has a larger magnetic resistance Rm than the magnetic pole portion 82c-2x at the first side in the circumferential directions xy (clockwise direction x side).

Thus, as illustrated in FIG. 14, at a slot $8S_{12}$ between the first spoke 82b-1 and the second spoke 82b-2, the magnetic pole portion 82c-1x and the magnetic pole portion 82c-2y both with a large magnetic resistance Rm are located close to one another. In this manner, the cogging torque can be further increased by disposing magnetic pole portions having a large magnetic resistance Rm close to one another at at least one slot (condition A).

Thus, in the present embodiment, of the magnetic pole portion pair 82c-3 of the third spoke 82b-3 adjacent to the second spoke 82b-2 at the first side (clockwise direction x side) in the circumferential directions xy, the magnetic resistance Rm (reference sign M) of the magnetic pole portion 82c-3y at the second side in the circumferential directions xy (anticlockwise direction y side) is less than the magnetic resistance Rm (reference sign H) of the magnetic pole portion 82c-2y at the second side in the circumferential directions xy (anticlockwise direction y side) of the magnetic pole portion pair of the second spoke 82b-2.

Thus, as illustrated in FIG. 14, at a slot $8S_{23}$ between the second spoke 82b-2 and the third spoke 82b-3, the magnetic pole portion 82c-2x and the magnetic pole portion 82c-3y both with a small magnetic resistance Rm are located close to one another. That is, at the slot $8S_{23}$ directly adjacent to the slot $8S_{12}$ between the first spoke 82b-1 and the second spoke 82b-2 where the magnetic pole portion 82c-1x and the magnetic pole portion 82c-2y both with a large magnetic resistance Rm are located close to one another, the magnetic pole portion 82c-2x and the magnetic pole portion 82c-3y both with a small magnetic resistance Rm are located close to one another. In this manner, when sections with a large magnetic resistance Rm and a small magnetic resistance Rm are located close to one another in the circumferential directions xy, the magnetic balance is upset to a further greater degree.

In this manner, regarding the circumferentially contiguous two slots $8S_{12}$ and $8S_{23}$, the magnetic pole portions both with a large magnetic resistance Rm (reference sign H) are located close to one another at the slot $8S_{12}$ and the magnetic pole portions both with a small magnetic resistance Rm (reference sign L) are located close to one another at the slot $8S_{23}$, so that a section with a large magnetic resistance Rm and a section with a small magnetic resistance Rm are disposed close to one another (condition B). Thus, the cogging torque can be even further increased.

Furthermore, in the present embodiment, the number of the spokes of the stator core 82 is an even number, and, at the magnetic pole portion pair 82c-4 of the fourth spoke 82b-4 at a position point-symmetric to the first spoke 82b-1 with respect to the shaft 30 (see FIG. 12), the magnetic resistance Rm of the magnetic pole portion 82c-4y is small (reference sign L) and the magnetic resistance Rm of the magnetic pole portion 82c-4x is large (reference sign H).

Also, at the magnetic pole portion pair 82c-5 of the fifth spoke 82b-5 at a position point-symmetric to the second spoke 82b-2 with respect to the shaft 30 (see FIG. 12), the magnetic resistance Rm of the magnetic pole portion 82c-5x is small (reference sign L) and the magnetic resistance Rm of the magnetic pole portion 82c-5y is large (reference sign H).

Thus, as illustrated in FIG. 14, at a slot $8S_{45}$ between the fourth spoke 82b-4 and the fifth spoke 82b-5 at a position point-symmetric to the slot $8S_{12}$ between the first spoke 82b-1 and the second spoke 82b-2 with respect to the shaft 30 (see FIG. 12), the magnetic pole portion 82c-4x and the magnetic pole portion 82c-5y both with a large magnetic resistance Rm are located close to one another.

Thus, as described above, also at a slot $8S_{12}$ between the first spoke 82b-1 and the second spoke 82b-2, the magnetic pole portion 82c-1x and the magnetic pole portion 82c-2y both with a large magnetic resistance Rm are located close to one another. Thus, the slots where magnetic pole portions with a large magnetic resistance Rm are located close to one another in the circumferential directions xy are located point-symmetrically.

In this manner, in the present embodiment, because the slots where magnetic pole portions with a large magnetic resistance Rm are located close to one another are located point-symmetrically (condition C), the cogging torque can be multiplicatively increased.

Note that in the present embodiment, the shape of the stator core 82 being the same as the shape of the rotor core 2 in the first embodiment has been described as an example. However, no such limitation is intended. For example, the stator core 82 may be replaced with a stator core with the same shape as any one of the rotor cores described in the second to seventh embodiments described above, and the effect of the present invention may be achieved with any of the shapes.

Ninth Embodiment

Figure 15:
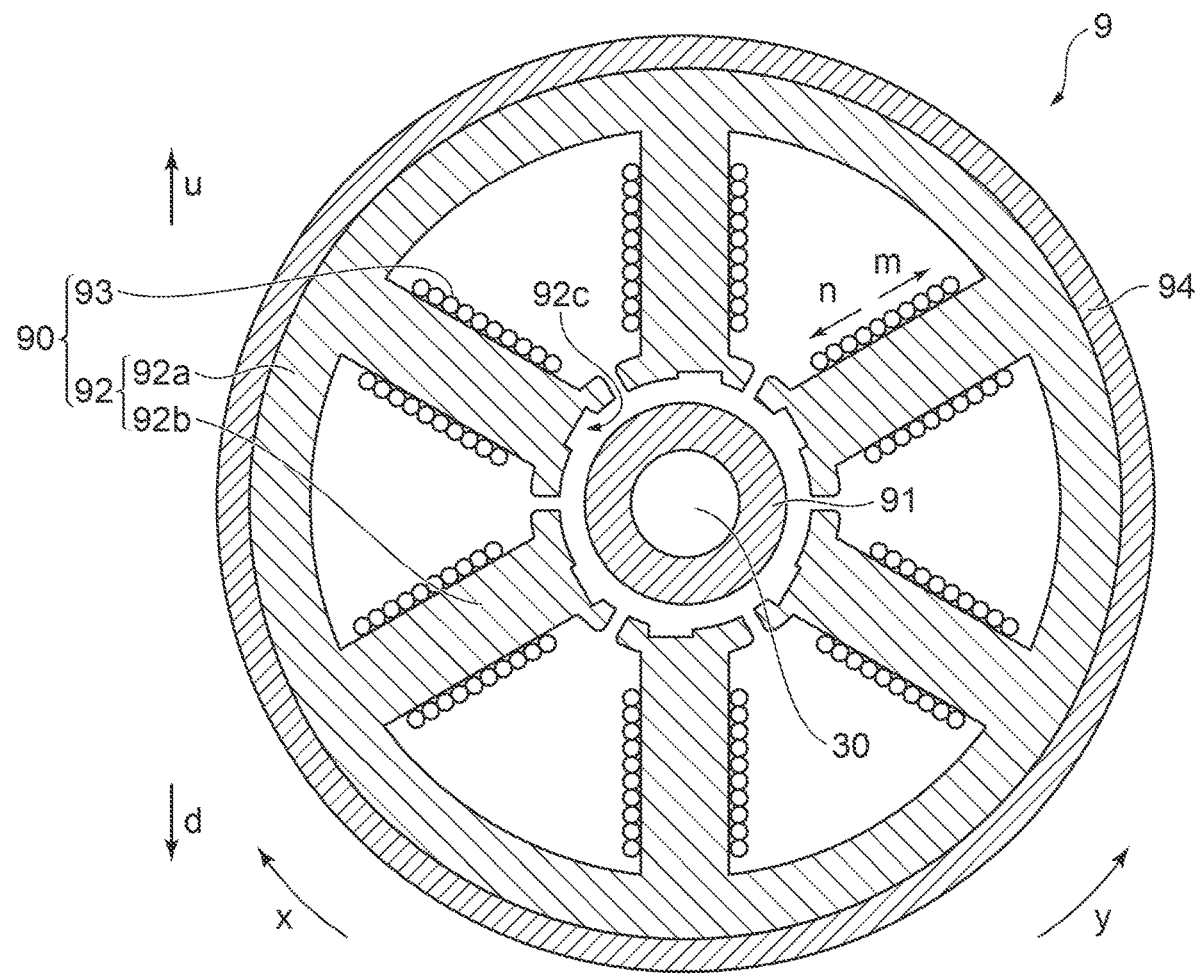
FIG. 15 is a cross-sectional view (transverse cross-sectional view) taken along a plane perpendicular to the direction of a shaft of a motor according to a ninth embodiment being an example of the present invention.

Next, a motor according to a ninth embodiment being an example of the present invention will be described with reference to the drawings. FIG. 15 is a cross-sectional view taken along a plane perpendicular to the direction of the shaft of a motor 9 according to the ninth embodiment.

The motor 9 according to the ninth embodiment is an inner rotor motor similar to the motor 1 according to the first embodiment, but the configurations of the rotor (rotor core 2 and rotor coils 3 in the first embodiment) and the stator (stator 10 in the first embodiment) are significantly different from the configurations of the rotor and the stator of the motor 1.

That is, in the motor 1 according to the first embodiment, the magnetic member including the coils 3 wound around the plurality (six) spokes 92b radially disposed with the magnetic pole portion pairs 92c at the distal ends facing outward is used as the rotor. The motor 9 according to the present embodiment is different in that a magnetic member including stator coils (coils) 93 wound around a plurality (six) of spokes 92b radially disposed with magnetic pole portion pairs 92c described below at the distal ends facing the center shaft 30 (facing the opposite direction to the direction in the motor 1) is used as a stator 90.

With this difference in the configuration of the magnetic member, the configuration of a rotor 91 of the present embodiment is significantly different from the rotor in the first embodiment as well as the configuration of the stator 10. That is, the rotor 91 in the present embodiment is a cylindrical member, the shaft 30 is inserted and fixed into the inner hole of the cylindrical member, and the outer surface serves as a magnet magnetized with S poles and the N poles being alternately arranged in the circumferential direction. Note that the rotor 91 may be configured by embedding magnets in the outer surface of the cylindrical member to alternately arrange the S poles and the N poles in a similar manner.

A stator 92 including the spokes 92b is disposed at the outer side of the rotor 91 with an outer circumferential surface being a magnet, the magnetic pole portion pairs 92c at the distal end opposing the rotor 91 via a predetermined gap. The stator 90 includes a stator core 92 including the six spokes 92b and a stator coil 93 wound around each of the spokes 92b.

The stator core 92 is a staked body made of silicon steel plates or the like and includes an annular portion 92a surrounding the shaft 30 and the spokes 92b described above extending in the radial direction (radially) from the inner circumferential surface of the annular portion 92a toward the center shaft (toward the shaft 30). Note that a cylindrical case 94 is disposed outside the annular portion 92a of the stator core 92, and the stator 90 is fixed at the case 94.

The stator core 92 also includes a pair of magnetic pole portions extending both directions of the circumferential directions xy and located at the end portion in the radial directions mn (specifically, the inward direction n) of each of the plurality (six) spokes 92b (each pair of magnetic pole portions may be collectively referred to as a "magnetic pole portion pair", and when a pair of magnetic pole portions is collectively referred to as a "magnetic pole portion pair" in the present embodiment, the reference sign "92c" or "92c-□" (□ is an integer) is used).

Note that though a cross-sectional view taken along a plane including the shaft of the motor 9 is omitted, in the present embodiment, the shaft 30 is fixed at the inner rings of two not-illustrated bearings located in the axial direction of the shaft 30, and the outer rings of the bearings is fixed at the case 94. Thus, the rotor 91 is rotatable with respect to the stator 90.

Figure 16:
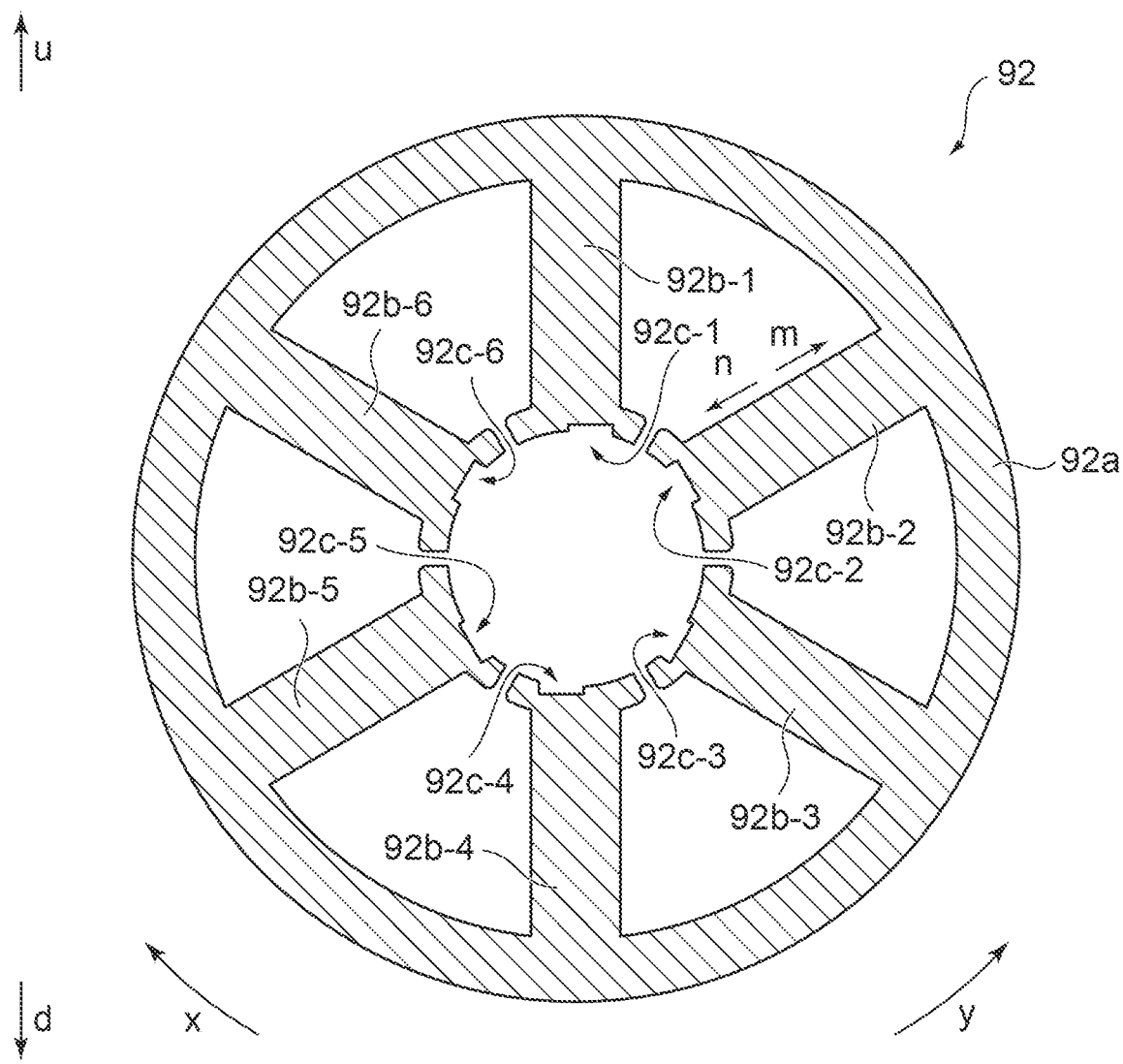
FIG. 16 is a transverse cross-sectional view of only a stator core extracted from the motor according to the ninth embodiment.

FIG. 16 is a transverse cross-sectional view of only the rotor core 92 extracted from the motor 9 according to the present embodiment. In the rotor core 92 illustrated in FIG. 16, the shapes of pairs of magnetic pole portions 92c-1x to 92c-6x and 92c-1y to 92c-6y of at least one spoke (in the present embodiment, all of the spokes 92b-1 to 92b-6) from among the plurality (even number (six in the present embodiment)) of spokes 92b-1 to 92b-6 are different from one another.

A description will be given in more detail.

First, in FIG. 16, the spoke extending from the annular portion 92a in the downward direction d is defined as a first spoke 92b-1, and the spokes in order from the first spoke 92b-1 in the clockwise direction x are defined as a second spoke 92b-2, a third spoke 92b-3, a fourth spoke 92b-4, a fifth spoke 92b-5, and a sixth spoke 92b-6.

Figure 17:
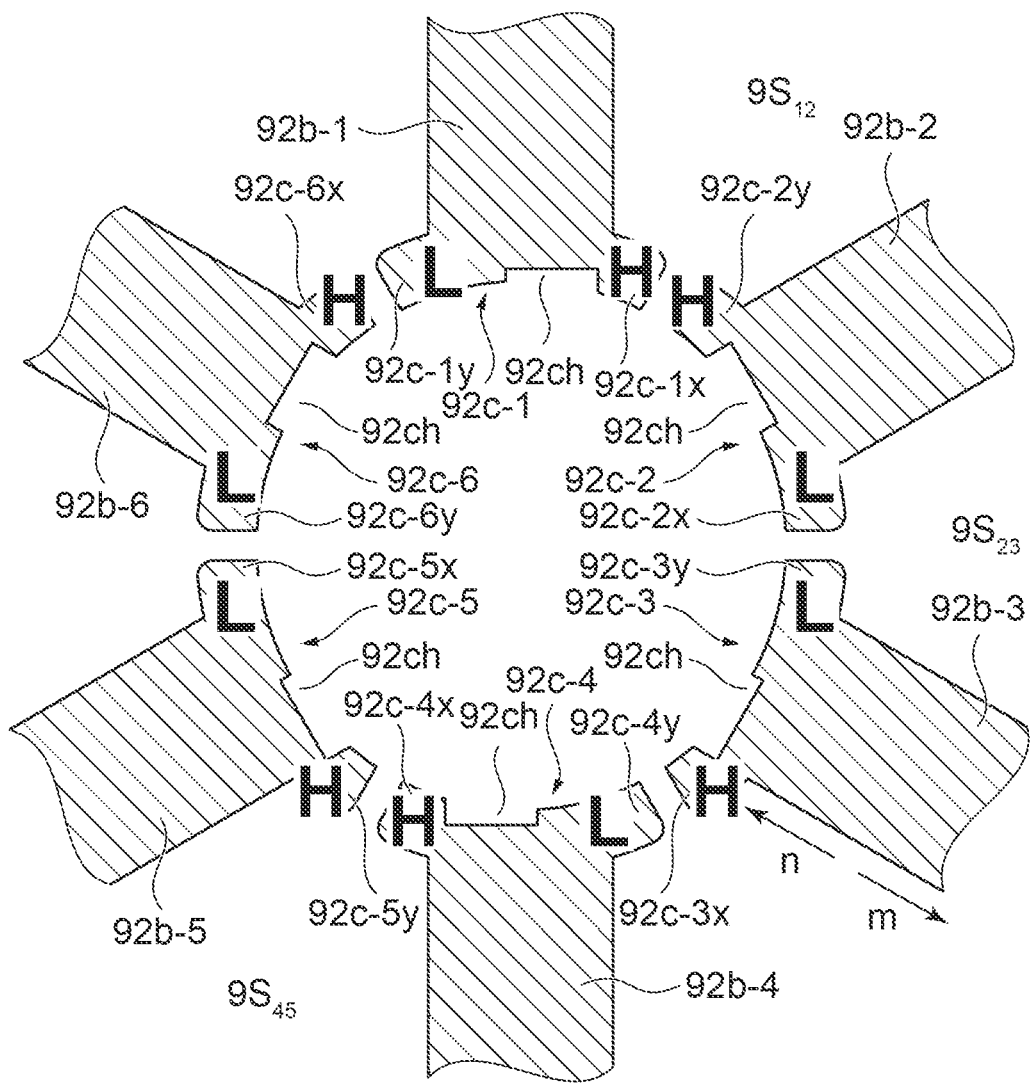
FIG. 17 is an enlarged view of the periphery of distal end portions of spokes of the motor according to the ninth embodiment.

FIG. 17 is an enlarged view of the periphery of distal end portions (periphery of the magnetic pole portions 92c) of the spokes 92b of the motor according to the ninth embodiment.

The magnetic pole portion pair 92c-1 at the end portion of the first spoke 92b-1 in the inward direction n is provided with, at the surface opposing the magnet 11 of the rotor 91 (see FIG. 15), a groove portion 92ch extending parallel with the axial direction of the shaft 30.

As illustrated in FIG. 17, the groove portion 92ch of the magnetic pole portion pair 92c-1 is located at a section offset from the center in the circumferential directions xy toward the clockwise direction x side (toward the second spoke 92b-2). Thus, as illustrated in FIG. 17, the magnetic pole portion 92c-1x at the clockwise direction x side of the magnetic pole portion pair 92c-1 has a smaller transverse cross-sectional area, and the magnetic pole portion 92c-1y at the anticlockwise direction y side has a larger transverse cross-sectional area.

Thus, compared to a case where the groove portion 92ch is located at the center of the magnetic pole portion pair 92c-1, offsetting the position of the groove portion 92ch from the center in the circumferential directions xy increases the magnetic resistance Rm of the magnetic pole portion 92c-1x close to the groove portion 92ch (reference sign H) and decreases the magnetic resistance Rm of the magnetic pole portion 92c-1y away from the groove portion 92ch (reference sign L) as illustrated in FIG. 17.

Thus, in the first spoke 92b-1, the magnetic pole portion 92c-1x at a first side in the circumferential directions xy (clockwise direction x side) has a larger magnetic resistance Rm than the magnetic pole portion 92c-1y at a second side in the circumferential directions xy (anticlockwise direction y side).

In the present embodiment, all magnetic pole portion pairs 92c-1 to 92c-6 of the six spokes 92b-1 to 92b-6 include a groove portion similar to the groove portion 92ch of the first spoke 92b-1, and the position of the groove portion 92ch is offset from the center in the circumferential directions xy in either one direction (the x direction or the y direction).

Regarding the magnetic pole portion pair 92c-2 of the second spoke 92b-2 located adjacent to the first spoke 92b-1 at the clockwise direction x side (first side in the circumferential directions xy), as illustrated in FIG. 17, the groove portion 92ch is located at a section offset from the center in the circumferential directions xy toward the anticlockwise direction y side (toward the first spoke 92b-1). Thus, as illustrated in FIG. 17, the magnetic pole portion 92c-2x at the clockwise direction x side of the magnetic pole portion pair 92c-2 has a larger transverse cross-sectional area, and the magnetic pole portion 92c-2y at the anticlockwise direction y side has a smaller transverse cross-sectional area.

Accordingly, compared to a case where the groove portion 92ch is located at the center of the magnetic pole portion pair 92c-2 in the circumferential directions xy, the magnetic resistance Rm of the magnetic pole portion 92c-2x away from the groove portion 92ch is decreased (reference sign L) and the magnetic resistance Rm of the magnetic pole portion 92c-2y close to the groove portion 92ch is increased (reference sign H) as illustrated in FIG. 17.

Thus, in the second spoke 92b-2, the magnetic pole portion 92c-2y at the second side in the circumferential directions xy (anticlockwise direction y side) has a larger magnetic resistance Rm than the magnetic pole portion 92c-2x at the first side in the circumferential directions xy (clockwise direction x side).

The magnetic pole portion pairs 92c-1 and 92c-2 of the first spoke 92b-1 and the second spoke 92b-2 are different from the magnetic pole portion pairs 2c-1 and 2c-2 of the first spoke 2b-1 and the second spoke 2b-2 in the first embodiment in that the magnetic pole portion pairs 92c-1 and 92c-2 are orientated to oppose the center axis (toward the shaft 30) and the magnetic pole portion pairs 2c-1 and 2c-2 are oriented to oppose the outer side (outer circumferential direction). However, in the circumferential direction, the size relationship in terms of the transverse cross-sectional area of the magnetic pole portions 92c, i.e., the arrangement of the magnetic pole portions 92c with large and small magnetic resistances Rm, is equal.

That is, in order in the clockwise direction x, the magnetic resistances Rm of the magnetic pole portion 92c-1y, the magnetic pole portion 92c-1x, the magnetic pole portion 92c-2y, and the magnetic pole portion 92c-2x have similar magnetic resistances Rm of the magnetic pole portion 2c-1y, the magnetic pole portion 2c-1x, the magnetic pole portion 2c-2y, and the magnetic pole portion 2c-2x according to the first embodiment, and reference signs given in this order are L, H, H, and L in both cases. Regarding the remaining magnetic pole portions 92c-3y to 92c-6y and the magnetic pole portions 92c-3x to 92c-6x are the same as the magnetic pole portions 2c-3y to 2c-6 and the magnetic pole portions 2c-3x~2c-6x according to the first embodiment.

Thus, also in the present embodiment, the same advantages and effects relating to the cogging torque as in the first embodiment are achieved. In other words, in the present embodiment, for all of the magnetic pole portion pairs 92c-1 to 92c-6 of the six spokes 92b-1 to 92b-6, the magnetic resistances Rm of the magnetic pole portions 92c-1x to 92c-6x at the first side (clockwise direction x side) in the circumferential directions xy are different from the magnetic resistances Rm of the magnetic pole portions 92c-1y to 92c-6y at the second side (anticlockwise direction y side) in the circumferential directions xy. Thus, in the present embodiment, the magnetic balance in the circumferential directions is upset, and an increase in cogging torque can be achieved.

Also, in the present embodiment, in the magnetic pole portion pair 92c-2 of the second spoke 92b-2, the magnetic pole portion 92c-2y at the second side in the circumferential directions xy (anticlockwise direction y side) has a larger magnetic resistance Rm than the magnetic pole portion 92c-2x at the first side in the circumferential directions xy (clockwise direction x side).

Thus, as illustrated in FIG. 17, at a slot $9S_{12}$ between the first spoke 92b-1 and the second spoke 92b-2, the magnetic pole portion 92c-1x and the magnetic pole portion 92c-2y both with a large magnetic resistance Rm are located close to one another. As described above, the cogging torque can be further increased by disposing magnetic pole portions having a large magnetic resistance Rm (reference sign H) close to one another at at least one slot (condition A).

Thus, in the present embodiment, at the magnetic pole portion pair 92c-3 of the third spoke 92b-3 adjacent to the second spoke 92b-2 at the first side (clockwise direction x side) in the circumferential directions xy, the magnetic resistance Rm (reference sign L) of the magnetic pole portion 92c-3y at the second side in the circumferential directions xy (anticlockwise direction y side) is less than the magnetic resistance Rm (reference sign H) of the magnetic pole portion 92c-2y at the second side in the circumferential directions xy (anticlockwise direction y side) of the magnetic pole portion pair 92c-2 of the second spoke 92b-2.

Thus, as illustrated in FIG. 17, at a slot $9S_{23}$ between the second spoke 92b-2 and the third spoke 92b-3, the magnetic pole portion 92c-2x and the magnetic pole portion 92c-3y both with a small magnetic resistance Rm are located close to one another. That is, at the slot $9S_{23}$ directly adjacent to the slot $9S_{12}$ between the first spoke 92b-1 and the second spoke 92b-2 where the magnetic pole portion 92c-1x and the magnetic pole portion 92c-2y both with a large magnetic resistance Rm are located close to one another, the magnetic pole portion 92c-2x and the magnetic pole portion 92c-3y both with a small magnetic resistance Rm are located close to one another. In this manner, when sections with a large magnetic resistance Rm and a small magnetic resistance Rm are located close to one another in the circumferential directions xy, the magnetic balance is upset to a further greater degree.

In this manner, regarding the circumferentially contiguous two slots $9S_{12}$ and $9S_{23}$, the magnetic pole portions both with a large magnetic resistance Rm (reference sign H) are located close to one another at the slot $9S_{12}$ and the magnetic pole portions both with a small magnetic resistance Rm (reference sign L) are located close to one another at the slot $9S_{23}$ (condition B). Thus, the cogging torque can be even further increased.

Furthermore, in the present embodiment, the number of the spokes of the stator core 92 is an even number, and, at the magnetic pole portion pair 92c-4 of the fourth spoke 92b-4 at a position point-symmetric to the first spoke 92b-1 with respect to the shaft 30 (see FIG. 15), the magnetic resistance Rm of the magnetic pole portion 92c-4y is small (reference sign L) and the magnetic resistance Rm of the magnetic pole portion 92c-4x is large (reference sign H).

Also, at the magnetic pole portion pair 92c-5 of the fifth spoke 92b-5 at a position point-symmetric to the second spoke 92b-2 with respect to the shaft 30 (see FIG. 15), the magnetic resistance Rm of the magnetic pole portion 92c-5x is small (reference sign L) and the magnetic resistance Rm of the magnetic pole portion 92c-5y is large (reference sign H).

Thus, as illustrated in FIG. 7, at a slot $9S_{45}$ between the fourth spoke 92b-4 and the fifth spoke 92b-5 at a position point-symmetric to the slot $9S_{12}$ (see FIG. 15) between the first spoke 92b-1 and the second spoke 92b-2 with respect to the shaft 30, the magnetic pole portion 92c-4x and the magnetic pole portion 92c-5y both with a large magnetic resistance Rm (reference sign H) are located close to one another.

Thus, as described above, also at a slot $9S_{12}$ between the first spoke 92b-1 and the second spoke 92b-2, the magnetic pole portion 92c-1x and the magnetic pole portion 92c-2y both with a large magnetic resistance Rm are located close to one another. Thus, the slots where magnetic pole portions with a large magnetic resistance Rm are located close to one another in the circumferential directions xy are located point-symmetrically.

In this manner, in the present embodiment, because the slots where magnetic pole portions with a large magnetic resistance Rm are located close to one another are located point-symmetrically (condition C), the cogging torque can be multiplicatively increased.

In the present embodiment described above, the inner rotor motor 9 has been described as an example. In the inner rotor motor 9, the stator 90 serving as a magnetic member characteristic of the present invention is fixed, a predetermined current is supplied to the stator coils 93 provided at the stator 90, and thus the shaft 30 is rotated along with the rotor 91 located at the inner side of the stator 90. However, in a similar manner to the relationship between the eighth embodiment and the first embodiment, the advantages and effects of the present invention can be achieved even when the function of the rotor and the stator are switched.

That is, in the present embodiment, the advantages and effects of the present invention can be achieved even with an outer rotor motor. In the outer rotor motor, a magnetic member having the same shape and configuration as the stator 80 and rotatably supported with respect to the case 94 is used as the rotor and a member corresponding to the rotor 81 fixed to the case 94 independently from the shaft 30 is used as the stator.

As described above, the motor of the present invention is described with reference to the preferred embodiments, but the motor of the present invention is not limited to the configurations of the embodiments described above. For example, in the embodiments described above, the numbers of spokes being five, six, and eleven have been described as an example. However, the number of the spokes is not limited to these numbers, and it is only required that there are a plurality of spokes. Also, regarding condition C particular when the number of the spokes is an even number, the number of the spokes is not limited to six, and may be four or eight or more. Furthermore, regarding condition D and condition E particular when the number of the spokes is an odd number, the number of the spokes is not limited to five and eleven, and may be three, seven, nine, or 13 or more.

Additionally, in the embodiments described above, as a method of adjusting the magnetic resistance of the magnetic pole portions of each spoke, a method of offsetting the position of the groove at the magnetic pole portion pair and a method of offsetting the position of the crimped portion at the magnetic pole portion pair have been described. However, the present invention is not limited to these methods, and other methods may be used, such as a method of changing the size of the cross-sectional area of the magnetic path of the magnetic pole portions.

Also, for each of large (reference sign H), medium (reference sign M), and small (reference sign L) magnetic resistances Rm, the magnetic resistance Rm of the magnetic pole portion of each spoke may be precisely equal or errors and differences where the magnetic resistances Rm are substantially equal may be allowed, and there may be clear differences between the magnitudes of the magnetic resistances Rm.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Motor
2 Rotor core (core)
2a Annular portion
2b Spoke
2b-1 First spoke
2b-2 Second spoke
2b-3 Third spoke
2b-4 Fourth spoke
2b-5 Fifth spoke
2b-6 Sixth spoke
2c, 2c-1 to 2c-6 Magnetic pole portion pair (pair of magnetic pole portions)
2c-1x to 2c-6x, 2c-1y to 2c-6y Magnetic pole portion
2ch Groove portion
3 Rotor coil (coil)
8 Motor
9 Motor
10 Stator
11 Magnet
12 Tubular portion
20 Rotor (magnetic member)
22 Rotor core (core)
22b-3 Third spoke
22b-6 Sixth spoke
22c-3, 22c-6 Magnetic pole portion pair (pair of magnetic pole portions)
22c-3x, 22c-6x, 22c-3y, 22c-6y Magnetic pole portion
30 Shaft
32 Rotor core (core)
32a Annular portion
32b-1 First spoke
32b-2 Second spoke
32b-3 Third spoke
32b-4 Fourth spoke
32b-5 Fifth spoke
32b-6 Sixth spoke
32c-1 to 32c-6 Magnetic pole portion pair (pair of magnetic pole portions)
32c-1x to 32c-6x, 32c-1y to 32c-6y Magnetic pole portion
32d Crimped portion
40 First bearing
41 Second bearing
42 Rotor core (core)
42a Annular portion
42b-1 First spoke
42b-2 Second spoke
42b-3 Third-a spoke
42b-4 Fourth-a spoke
42b-5 Fifth-a spoke
42c-1 to 42c-5 Magnetic pole portion pair (pair of magnetic pole portions)
42c-1x to 42c-5x, 42c-1y to 42c-5y Magnetic pole portion
50 Lid portion
52 Rotor core (core)
52b-3 Third-b spoke
52b-4 Fourth-b spoke
52b-5 Fifth-b spoke
52c-3 to 52c-5 Magnetic pole portion pair (pair of magnetic pole portions)
52c-3x to 52c-5x, 52c-3y to 52c-5y Magnetic pole portion
60 Bottom portion
61 Bottom portion
62 Rotor core (core)
62a Annular portion
62b-1 First spoke
62b-2 Second spoke
62b-3 Third spoke
62b-4 Fourth-a spoke
62b-5 Fifth-a spoke
62b-6 Sixth spoke
62b-7 Seventh spoke
62b-8 Eighth spoke
62b-9 Ninth spoke
62b-10 Tenth spoke
62b-11 Eleventh spoke
62c-1 to 62c-11 Magnetic pole portion pair (pair of magnetic pole portions)
62c-1x to 62c-11x, 62c-1y to 62c-11y Magnetic pole portion
72 Rotor core (core)
72b-3 Third-b spoke
72b-4 Fourth-b spoke
72b-5 Fifth-b spoke
72c-3 to 72c-5 Magnetic pole portion pair (pair of magnetic pole portions)
72c-3x to 72c-5x, 72c-3y to 72c-5y Magnetic pole portion
80 Stator (magnetic member)
81 Rotor 81a Magnet
81b Tubular portion
81c Rotor hub
81d Connection portion
82 Stator core (core)
82a Annular portion
82b Spoke
82c-1 to 82c-6 Magnetic pole portion pair (pair of magnetic pole portions)
82c-1x to 82c-6x, 82c-1y to 82c-6y Magnetic pole portion
82e Stator hub
82f Annular extending portion
83 Stator coil (coil)
90 Stator (magnetic member)
91 Rotor (magnet)
92 Stator core (core)
92a Annular portion
92b Spoke
92c, 92c-1 to 92c-6 Magnetic pole portion pair (pair of magnetic pole portions)
92c-1x to 92c-6x, 92c-1y to 92c-6y Magnetic pole portion
93 Stator coil (coil)
94 Case
101 Motor
102 Rotor core
102b Spoke
102c Magnetic pole portion pair
102ch Groove portion
102cx, 102cy Magnetic pole portion

The invention claimed is:

1. A motor comprising:
a shaft;
a magnetic member including a plurality of spokes extending from the shaft in a radial direction, and plurality of coils wound around the plurality of spokes; and
a magnet disposed in an annular shape, wherein
one of the magnetic member and the magnet is disposed inside the other of the magnetic member and the magnet in the radial direction;
end portions of the plurality of spokes oppose the magnet in the radial direction;
each end portions of the plurality of spokes includes a pair of magnetic pole portions extending in opposite directions in a circumferential direction and a surface opposing the magnet; and
the plurality of spokes include a first spoke and a second spoke and a third spoke, the second spoke being arranged in an one magnetic pole portion side of the pair of magnetic pole portions of the first spoke in the circumferential direction, the third spoke being arranged in another magnetic pole portion side of the pair of magnetic pole portions of the first spoke in the circumferential direction,
a magnetic resistance at the one magnetic pole portion of the first spoke is larger than a magnetic resistance at the another magnetic pole portion of the first spoke,
a groove portion is formed at the surface of the end portion of the first spoke located on the second spoke side with respect to the first spoke,
a magnetic resistance at the another magnetic pole portion of the second spoke is larger than a magnetic resistance at the one magnetic pole portion of the second spoke,
a groove portion is formed at the surface of the end portion of the second spoke located on the first spoke side with respect to the second spoke,
magnetic resistances at a pair of magnetic pole portions of the third spoke is substantially equal,
the surface of the end portion of the third spoke includes a groove portion located at a center of the third spoke in the circumferential direction,
the number of the plurality of spokes is an even number,
among the plurality of spokes, other spoke at a position point-symmetric to the first spoke with respect to the shaft is defined as a fourth spoke, and other spoke at a position point-symmetric to the second spoke with respect to the shaft is defined as a fifth spoke;
a magnetic resistance at one magnetic pole portion of the fourth spoke is larger than a magnetic resistance at another magnetic pole portion of the fourth spoke,
a magnetic resistance at another magnetic pole portion of the fifth spoke is larger than a magnetic resistance at one magnetic pole portion of the fifth spoke.

2. A motor comprising:
a shaft;
a magnetic member including a plurality of spokes extending from the shaft in a radial direction,
a magnet disposed in an annular shape, wherein
and plurality of coils wound around the plurality of spokes, wherein
one of the magnetic member and the magnet is disposed inside the other of the magnetic member and the magnet in the radial direction;
end portions of the plurality of spokes oppose the magnet in the radial direction;
each end portions of the plurality of spokes includes a pair of magnetic pole portions extending in opposite directions in a circumferential direction and a surface opposing the magnet; and
the plurality of spokes include a first spoke and a second spoke and a third spoke, the second spoke being arranged in an one magnetic pole portion side of the pair of magnetic pole portions of the first spoke in the circumferential direction, the third spoke being arranged in another magnetic pole portion side of the pair of magnetic pole portions of the first spoke in the circumferential direction,
a magnetic resistance at the one magnetic pole portion of the first spoke is larger than a magnetic resistance at the another magnetic pole portion of the first spoke,
a magnetic resistance at the another magnetic pole portion of the second spoke is larger than a magnetic resistance at the one magnetic pole portion of the second spoke,
magnetic resistances at a pair of magnetic pole portions of the third spoke is larger than the magnetic resistance at the another magnetic pole portion of the first spoke and smaller than the magnetic resistance at the one magnetic pole portion of the first spoke,
among the plurality of spokes, other spoke at a position point-symmetric to the first spoke with respect to the shaft is defined as a fourth spoke, and other spoke at a position point-symmetric to the second spoke with respect to the shaft is defined as a fifth spoke;
a magnetic resistance at one magnetic pole portion of the fourth spoke is larger than a magnetic resistance at another magnetic pole portion of the fourth spoke,
a magnetic resistance at another magnetic pole portion of the fifth spoke is larger than a magnetic resistance at one magnetic pole portion of the fifth spoke.

3. The motor according to claim 2, wherein
a pair of magnetic pole portions of the third spoke is substantially equal.

4. The motor according to claim 2, wherein
the number of the plurality of spokes is an even number.

5. A motor comprising:

a shaft;

a magnetic member including a plurality of spokes extending from the shaft in a radial direction, a magnet disposed in an annular shape, wherein and plurality of coils wound around the plurality of spokes, wherein one of the magnetic member and the magnet is disposed inside the other of the magnetic member and the magnet in the radial direction;

end portions of the plurality of spokes oppose the magnet in the radial direction;

each end portions of the plurality of spokes includes a pair of magnetic pole portions extending in opposite directions in a circumferential direction and a surface opposing the magnet; and the plurality of spokes include a first spoke and a second spoke and a third spoke, the second spoke being arranged in an one magnetic pole portion side of the pair of magnetic pole portions of the first spoke in the circumferential direction, the third spoke being arranged in another magnetic pole portion side of the pair of magnetic pole portions of the first spoke in the circumferential direction, a groove portion is formed at the surface of the end portion of the first spoke located on the second spoke side with respect to the first spoke, a groove portion is formed at the surface of the end portion of the second spoke located on the first spoke side with respect to the second spoke, the surface of the end portion of the third spoke includes a groove portion located at a center of the third spoke in the circumferential direction, among the plurality of spokes, other spoke at a position point-symmetric to the first spoke with respect to the shaft is defined as a fourth spoke, and other spoke at a position point-symmetric to the second spoke with respect to the shaft is defined as a fifth spoke;

a magnetic resistance at one magnetic pole portion of the fourth spoke is larger than a magnetic resistance at another magnetic pole portion of the fourth spoke, a magnetic resistance at another magnetic pole portion of the fifth spoke is larger than a magnetic resistance at one magnetic pole portion of the fifth spoke.

6. The motor according to claim 5, wherein the number of the plurality of spokes is an even number.

\* \* \* \* \*